(12) United States Patent
Hirakata et al.

(10) Patent No.: US 9,710,013 B2
(45) Date of Patent: Jul. 18, 2017

(54) DISPLAY PANEL, DATA PROCESSING DEVICE, PROGRAM

(71) Applicant: Semiconductor Energy Laboratory Co., Ltd., Atsugi-shi, Kanagawa-ken (JP)

(72) Inventors: Yoshiharu Hirakata, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 2 days.

(21) Appl. No.: 14/817,593

(22) Filed: Aug. 4, 2015

(65) Prior Publication Data

US 2016/0041428 A1    Feb. 11, 2016

(30) Foreign Application Priority Data

Aug. 8, 2014  (JP) ................................ 2014-162242
Aug. 8, 2014  (JP) ................................ 2014-162278

(51) Int. Cl.
*G09G 3/36*       (2006.01)
*G06F 1/16*       (2006.01)
(Continued)

(52) U.S. Cl.
CPC .......... *G06F 1/1601* (2013.01); *G02F 1/1334* (2013.01); *G02F 1/133621* (2013.01);
(Continued)

(58) Field of Classification Search
CPC .............. G02F 1/1334; G02F 2201/44; G02F 1/133621; G09G 3/36; G06F 1/1601;
(Continued)

(56) References Cited

U.S. PATENT DOCUMENTS 6,714,268 B2   3/2004   Wang et al.
7,038,641 B2   5/2006   Hirota et al.
(Continued)

FOREIGN PATENT DOCUMENTS

JP   2001-066593 A   3/2001
JP   2002-196702 A   7/2002
(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.
(Continued)

*Primary Examiner* — Charles Hicks
(74) *Attorney, Agent, or Firm* — Fish & Richardson P.C.

(57) ABSTRACT

A novel display panel that is highly convenient or reliable is provided. Alternatively, a novel display panel that consumes less power when used under external light is provided. The inventors have reached an idea of a structure including: a first display element including a first electrode, a common electrode overlapping with the first electrode, and a layer including a luminescent organic compound between the first electrode and the common electrode; a second display element including the common electrode, a second electrode overlapping with the common electrode, and a layer including liquid crystal between the second electrode and the common electrode; an insulating layer between the common electrode and the layer including liquid crystal; a first display region including a plurality of the first display elements; and a second display region including a plurality of the second display elements and overlapping with the first display region.

8 Claims, 18 Drawing Sheets

(51) Int. Cl.
*G02F 1/1334* (2006.01)
*G02F 1/1335* (2006.01)

(52) U.S. Cl.
CPC ............ *G06F 1/163* (2013.01); *G06F 1/1616* (2013.01); *G06F 1/1637* (2013.01); *G06F 1/1641* (2013.01); *G06F 1/1652* (2013.01); *G02F 2201/44* (2013.01); *G09G 3/36* (2013.01)

(58) Field of Classification Search
CPC .... G06F 1/1616; G06F 1/1637; G06F 1/1641; G06F 1/1652; G06F 1/163
See application file for complete search history.

(56) References Cited

U.S. PATENT DOCUMENTS

| | | |
|---|---|---|
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,385,654 B2 | 6/2008 | Mitsui et al. |
| 2003/0201960 A1 | 10/2003 | Fujieda |
| 2006/0072047 A1 | 4/2006 | Sekiguchi |
| 2007/0242031 A1 | 10/2007 | Kimura et al. |
| 2008/0180618 A1 | 7/2008 | Fujieda |
| 2010/0171905 A1 | 7/2010 | Huang et al. |
| 2011/0199404 A1 | 8/2011 | Umezaki et al. |
| 2012/0208637 A1 | 8/2012 | Hirakata |
| 2012/0306940 A1* | 12/2012 | Machida ............... G02B 6/005 345/690 |
| 2016/0042696 A1 | 2/2016 | Hirakata et al. |
| 2016/0042702 A1 | 2/2016 | Hirakata et al. |

FOREIGN PATENT DOCUMENTS

| | | |
|---|---|---|
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 2007-304578 A | 11/2007 |
| JP | 4161574 | 10/2008 |
| JP | 2011-186449 A | 9/2011 |
| JP | 2013-221965 A | 10/2013 |
| WO | WO-2004/053819 | 6/2004 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

* cited by examiner

FIG. 9A
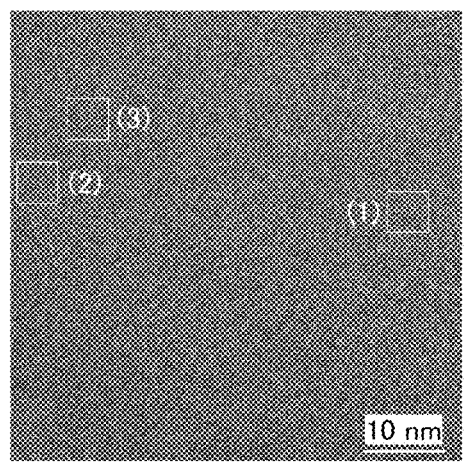
FIG. 9B       FIG. 9C       FIG. 9D
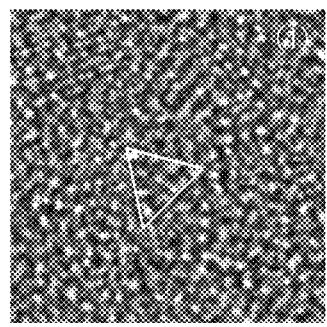  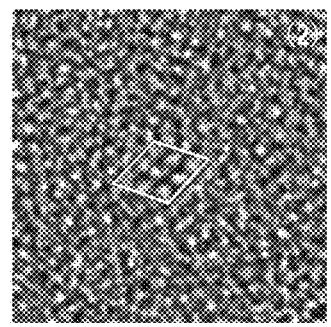  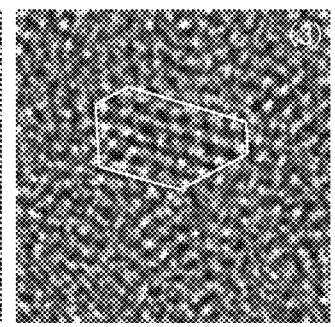

FIG. 18A1
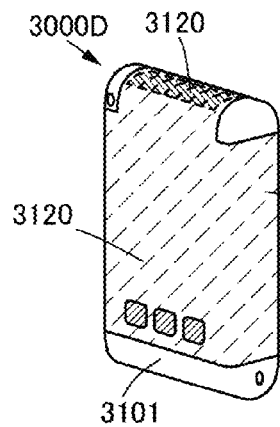
FIG. 18A2
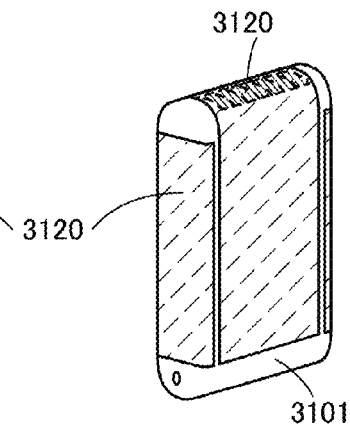
FIG. 18A3
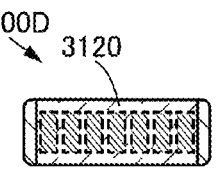
FIG. 18B1
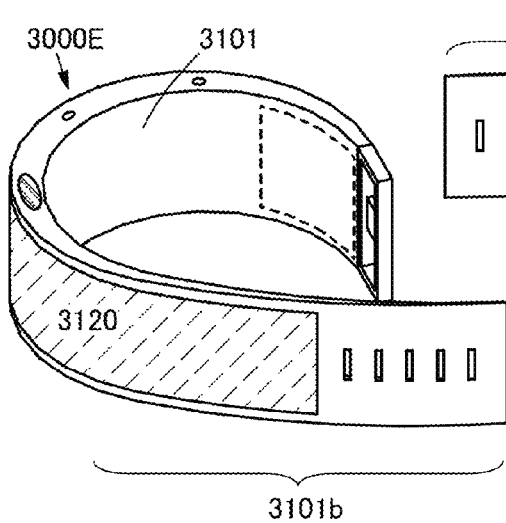
FIG. 18B2
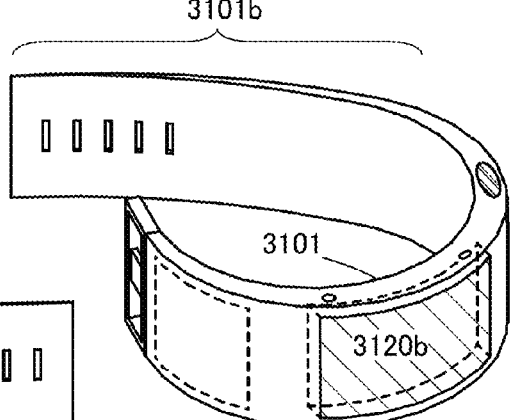
FIG. 18C1
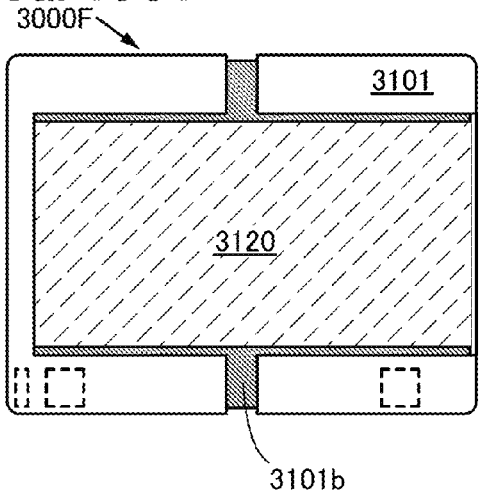
FIG. 18C2
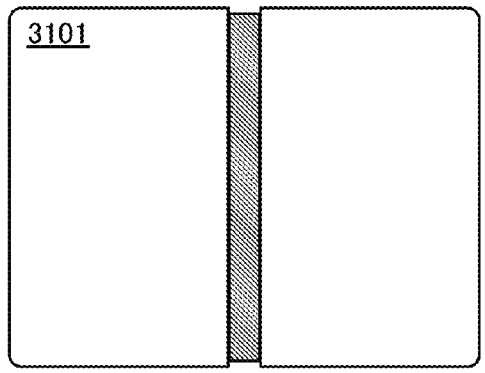

DISPLAY PANEL, DATA PROCESSING DEVICE, PROGRAM

BACKGROUND OF THE INVENTION

1. Field of the Invention

One embodiment of the present invention relates to a display panel, a data processing device, or a program.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

A technique for reducing power consumption is known in which a refresh rate is reduced when a still image is displayed on a display portion (see Patent Document 1).

A display device including a light-emitting element and a liquid crystal element overlapping with the light emitting element is known (see Patent Document 2).

REFERENCE

Patent Document

[Patent Document 1] Japanese Published Patent Application No. 2011-186449
[Patent Document 2] Japanese Published Patent Application No. 2007-304578

SUMMARY OF THE INVENTION

An object of one embodiment of the present invention is to provide a novel display panel that is highly convenient or reliable. Another object of one embodiment of the present invention is to provide a novel data processing device that is highly convenient or reliable. Another object of one embodiment of the present invention is to provide a novel program that is highly convenient or reliable. Another object of one embodiment of the present invention is to provide a novel display panel, a novel data processing device, a novel program, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a display panel including: a first base; a second base that overlaps with the first base; a first display element including a first electrode, a common electrode that overlaps with the first electrode, and an EL layer (a layer including a luminescent organic compound) between the first electrode and the common electrode; a second display element including a second electrode that overlaps with the common electrode, and an LC layer (a layer including liquid crystal) between the second electrode and the common electrode; an insulating layer between the common electrode and the LC layer; a first display region including a plurality of the first display elements; and a second display region including a plurality of the second display elements and overlapping with the first display region.

The first display element has a function of emitting light, and the second display element has a function of controlling light transmittance.

One embodiment of the present invention is the above display panel in which the first base and the second base have flexibility.

One embodiment of the present invention is the above display panel in which the layer including liquid crystal contains a polymer and liquid crystal dispersed in the polymer.

One embodiment of the present invention is the above display panel in which the first display region has a function of displaying an image toward the side where the second display region is provided, and the second display region has a function of displaying an image by controlling transmittance of light entering from the opposite side to the side where the first display region is provided.

One embodiment of the present invention is the display panel further including a coloring layer. The second electrode is sandwiched between the coloring layer and the layer including liquid crystal.

A display panel of one embodiment of the present invention includes: a first display element having a function of emitting light and including a first electrode, a common electrode that overlaps with the first electrode, and a layer including a luminescent organic compound between the first electrode and the common electrode; a second display element having a function of controlling light transmittance and including the common electrode, a second electrode that overlaps with the common electrode, and a layer including liquid crystal between the second electrode and the common electrode; an insulating layer between the common electrode and the layer including liquid crystal; a first display region including a plurality of the first display elements; and a second display region including a plurality of the second display elements and overlapping with the first display region.

With such a structure, an image can be displayed with the use of light from outside and the second display element and without the use of the first display region, or can be displayed with the use of the second display region in a condition to transmit light and the first display element. Thus, the novel display panel can be highly convenient or reliable. In addition, the novel display panel would consume less power when used under external light.

Another embodiment of the present invention is a data processing device including an input/output device having a function of supplying sensing data and receiving image data, and an arithmetic device having a function of receiving the sensing data and supplying the image data.

The input/output device includes a display device and a sensing portion having a function of sensing illuminance under usage environment of the display device and supplying the sensing data including data of the illuminance. The display device includes the above display panel.

The arithmetic device includes an arithmetic portion and a memory portion that stores a program to be executed in the arithmetic portion. The program includes a step for making the first display region display the image data and making light transmittance of the second display region high when the sensing data includes data of the illuminance less than predetermined illuminance, and a step for making the second display region display the image data when the sensing data includes data of the illuminance more than or equal to the predetermined illuminance.

The data processing device of one embodiment of the present invention includes: the display device that includes the display panel and is supplied with the image data; the sensing portion sensing illuminance under usage environment of the display device and supplying the sensing data; and the arithmetic device that makes the first display region display the image data and makes light transmittance of the second display region high when the sensing data includes data of the illuminance less than the predetermined illuminance, and that makes the second display region display the image data when the sensing data includes data of the illuminance more than or equal to the predetermined illuminance. With such a structure, the image data can be displayed on the first display region or the second display region depending on the illuminance under usage environment of the display device. Thus, the novel data processing device can be highly convenient or reliable.

One embodiment of the present invention is a program to be executed in the arithmetic portion of the data processing device. The program includes: a first step of initialization; a second step of allowing interrupt processing; a third step of generating image data; a fourth step of obtaining the sensing data; a fifth step that forwards processing to a sixth step if the sensing data includes data of illuminance less than the predetermined illuminance, while forwards to a tenth step if the sensing data includes data of the illuminance more than or equal to the predetermined illuminance; the sixth step of making transmittance of the second display region high; a seventh step of making the first display region display the image data; an eighth step that forwards the processing to a ninth step if a termination instruction is supplied, while returns to the third step if the termination instruction is not supplied; the ninth step of terminating the processing; and the tenth step of making the second display region display the image data and returning to the eighth step.

In the data processing device of one embodiment of the present invention, the program includes a step of making transmittance of the second display region high and making the first display region display the image data when the sensing data includes data of the illuminance less than the predetermined illuminance, and a step of making the second display region display the image data when the sensing data includes data of the illuminance more than or equal to the predetermined illuminance. Therefore, the image data can be displayed on the first display region or the second display region depending on the illuminance under usage environment of the display device. Thus, the novel program can be highly convenient or reliable.

One embodiment of the present invention is a data processing device including the display panel described above, and any of an antenna, a battery, a button, and a housing.

In addition, a display panel might include any of the following modules in its category: a module in which a connector such as a flexible printed circuit (FPC) or a tape carrier package (TCP) is attached to a display panel, a module where a printed wiring board is provided at the end of a TCP, or a module having an integrated circuit (IC) directly mounted on a substrate over which a light-emitting element is formed by a chip on glass (COG) method.

Although the block diagram attached this specification shows elements classified according to their functions in independent blocks, it may be practically difficult to completely separate the elements according to their functions and, in some cases, one element may be involved in a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state means not only a state of direct connection but also a state of indirect connection through a circuit element such as a wiring, a resistor, a diode, or a transistor that allows current, voltage, or a potential to be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Further, in this specification, one of a first electrode and a second electrode of a transistor refers to a source electrode and the other refers to a drain electrode.

One embodiment of the present invention can provide a novel display panel that is highly convenient or reliable. Another embodiment of the present invention can provide a novel data processing device that is highly convenient or reliable. Alternatively, a novel program that is highly convenient or reliable can be provided. Alternatively, a novel display panel, a novel data processing device, a novel program, or a novel semiconductor device can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 1A, 1B, 1C1, and 1C2 illustrate a structure of a display panel of one embodiment;

FIGS. 7A, 7B, 7C1, and 7C2 are each a projection view illustrating a structure of a data processing device of one embodiment;

FIGS. 9A to 9D are Cs-corrected high-resolution TEM images of a plane of a CAAC-OS;

FIGS. 18A1, 18A2, 18A3, 18B1, 18B2, 18C1, and 18C2 are each a projection view illustrating a structure of a data processing device of one embodiment.

DETAILED DESCRIPTION OF THE INVENTION

Figure 1A:
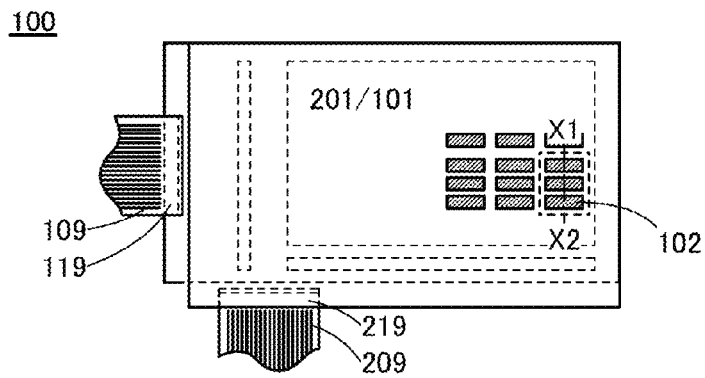

A display panel of one embodiment of the present invention includes: a first base; a second base that overlaps with the first base; a first display element capable of emitting light and including a first electrode, a common electrode that overlaps with the first electrode, and a layer including a luminescent organic compound between the first electrode and the common electrode; a second display element capable of controlling light transmittance and including the common electrode, a second electrode that overlaps with the common electrode, and a layer including liquid crystal between the second electrode and the common electrode; an insulating layer between the common electrode and the layer including liquid crystal; a first display region including a plurality of the first display elements; and a second display region including a plurality of the second display elements and overlapping with the first display region.

With such a structure, an image can be displayed with the use of light from outside and the second display element and without the use of the first display region, or can be displayed with the use of the second display region in a condition to transmit light and the first display element. Thus, the novel display panel can be highly convenient or reliable. In addition, the novel display panel would consume less power when used under external light.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

In this embodiment, a structure of a display panel of one embodiment of the present invention will be described with reference to FIGS. 1A, 1B, 1C1 and 1C2.

Figure 1B:
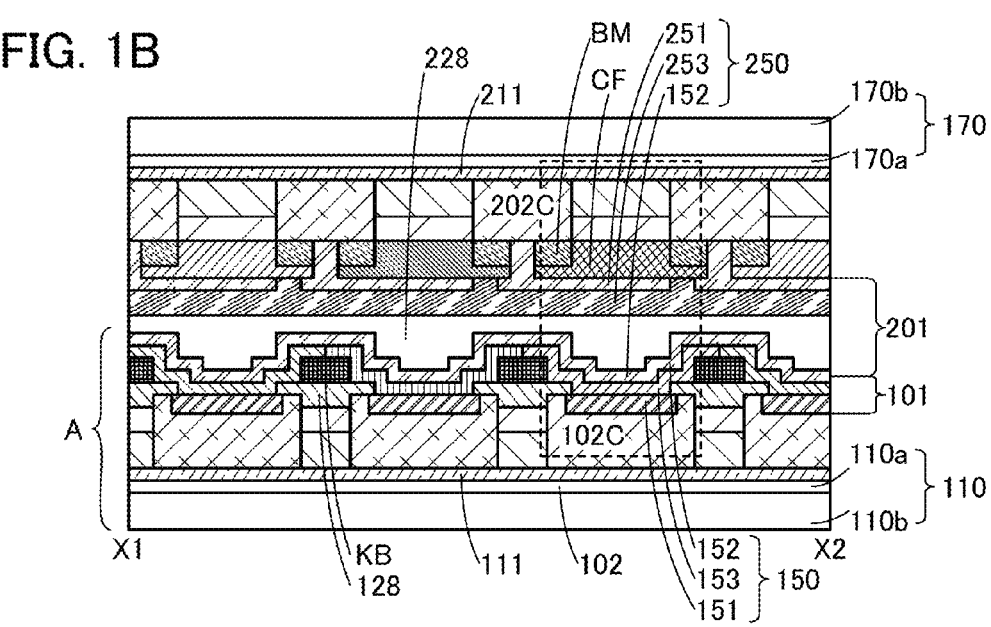
Figure 1B:
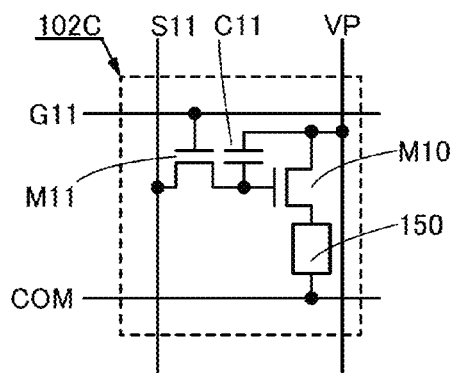
Figure 1B:
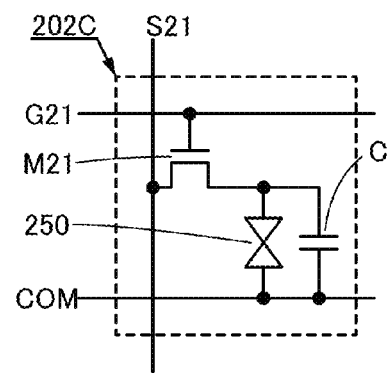

FIGS. 1A to 1C2 illustrate a structure of a display panel 100 of one embodiment of the present invention. FIG. 1A is a top view of the display panel 100 of one embodiment of the present invention. FIG. 1B is a cross-sectional view of the display panel 100 taken along line X1-X2 in FIG. 1A. FIG. 1C1 is a circuit diagram of a pixel circuit 102C that can be used in the display panel 100, and FIG. 1C2 is a circuit diagram of a pixel circuit 202C that can be used in the display panel 100.

Figure 2A:
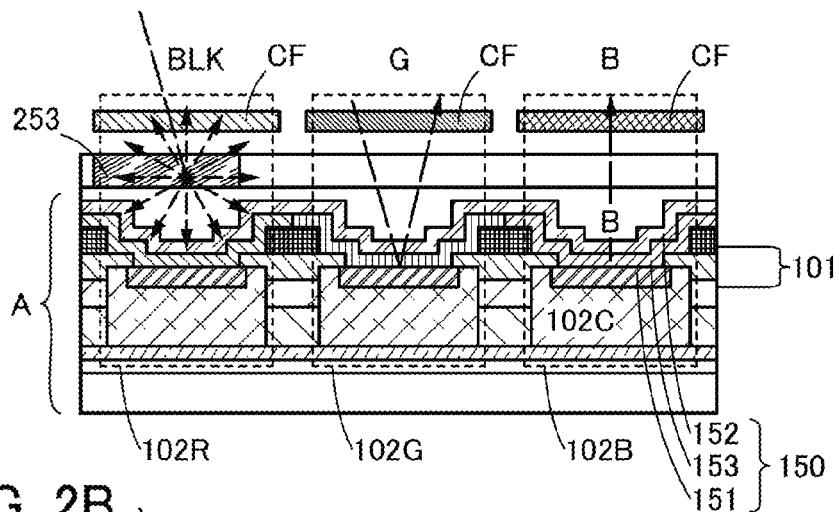
FIGS. 2A to 2C each illustrate a structure and a driving method of a display panel of one embodiment.
Figure 2B:
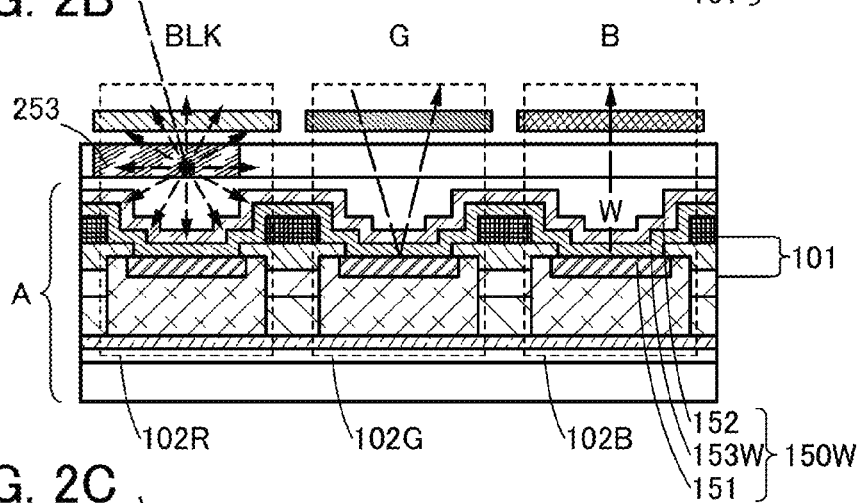
Figure 2C:
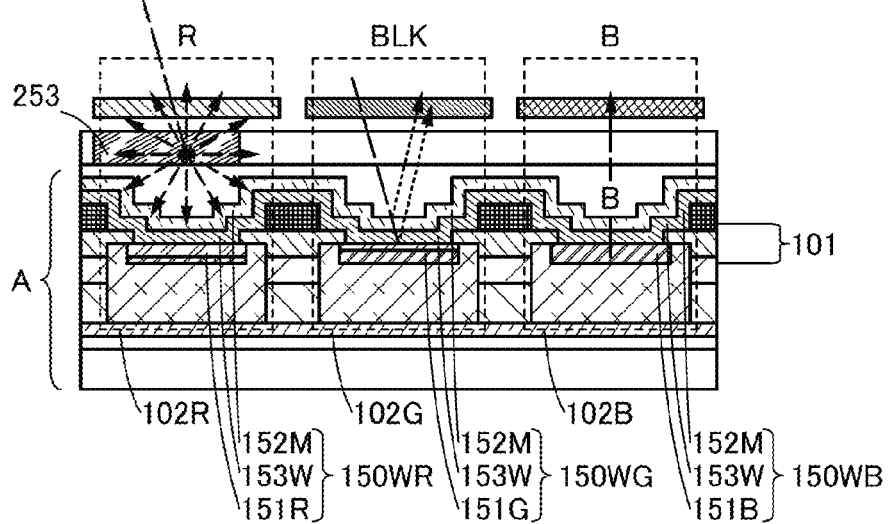

FIG. 2A is a cross-sectional view illustrating part of the structure and a driving method of the display panel 100 shown in FIGS. 1A to 1C2. FIGS. 2B and 2C are each a cross-sectional view illustrating part of a structure and a driving method of a modified example of the display panel 100 in FIGS. 1A to 1C2.

<Structure Example 1 of Display Panel>

The display panel 100 described in this embodiment includes a first base 110, a second base 170 overlapping with the first base 110, a first display element 150, a second display element 250, an insulating layer 228, a first display region 101, and a second display region 201 (see FIGS. 1A and 1B).

The first display element 150 includes a first electrode 151, a common electrode 152 overlapping with the first electrode 151, and an EL layer 153 (a layer including a luminescent organic compound) between the first electrode 151 and the common electrode 152 (see FIG. 1B).

The second display element 250 includes a second electrode 251 overlapping with the common electrode 152, and an LC layer 253 (a layer including liquid crystal) between the common electrode 152 and the second electrode 251.

The insulating layer 228 is provided between the common electrode 152 and the LC layer 253.

The first display region 101 includes a plurality of first display elements 150.

The second display region 201 includes a plurality of second display elements 250 and overlaps with the first display region 101.

The first display element 150 has a function of emitting light. The second display element 250 has a function of controlling light transmittance.

In addition, the first base 110 and the second base 170 have flexibility.

The LC layer 253 includes a polymer and liquid crystal dispersed in the polymer.

The first display region 101 has a function of displaying an image toward the side where the second display region 201 is provided. The second display region 201 has a function of displaying an image by controlling transmittance of light entering from the opposite side to the side where the first display region 101 is provided.

In addition, a coloring layer CF is provided. The second electrode 251 is provided between the coloring layer CF and the LC layer 253.

The display panel illustrated in this embodiment includes: the first base 110; the second base 170 overlapping with the first base 110; the first display element 150 capable of emitting light and including the first electrode 151, the common electrode 152 that overlaps with the first electrode 151, and the EL layer 153 between the first electrode 151 and the common electrode 152; the second display element 250 capable of controlling light transmittance and including the common electrode 152, the second electrode 251 that overlaps with the common electrode 152, and the LC layer 253 between the second electrode 251 and the common electrode 152; the insulating layer 228 between the common electrode 152 and the LC layer 253; the first display region 101 including the plurality of first display elements 150; and the second display region 201 including the plurality of second display elements 250 and overlapping with the first display region 101.

With such a structure, an image can be displayed with the use of light from outside and the second display element and without the use of the first display region, or can be displayed with the use of the second display region in a condition to transmit light and the first display element. Thus, the novel display panel can be highly convenient or reliable. In addition, the novel display panel would consume less power when used under external light.

Furthermore, the display panel 100 includes the pixel circuit 102C for driving the first display element 150, and a wiring 111 electrically connected to the pixel circuit 102C. The display panel 100 further includes the pixel circuit 202C for driving the second display element 250, and a wiring 211 electrically connected the pixel circuit 202C. Note that FIG. 1B schematically illustrates the pixel circuit 102C and the pixel circuit 202C.

In addition, the display panel 100 includes a terminal portion 119 and a terminal portion 219. The terminal portion 119 includes a terminal electrically connected to the wiring 111, and the terminal portion 219 includes a terminal electrically connected to the wiring 211. The terminal portion 119 is electrically connected to a flexible printed circuit board (FPC) 109, and the terminal portion 219 is electrically connected an FPC 209.

The display panel 100 further includes a pixel 102.

The pixel 102 includes at least a pair of the first display element 150 and the pixel circuit 102C and a pair of the second display element 250 and the pixel circuit 202C. The pixel 102 may include the pair of the first display element 150 and the pixel circuit 102C and the plural pairs of the second display elements 250 and the pixel circuits 202C. Alternatively, the pixel 102 may include the plural pairs of the first display elements 150 and the pixel circuits 102C and the pair of the second display element 250 and the pixel circuit 202C.

The display panel 100 includes a light-blocking layer BM with an opening. The opening overlaps with the second electrode 251.

The display panel 100 includes a partition 128 with an opening. The opening overlaps with the first electrode 151. The partition 128 has an insulation property, and covers an end portion of the first electrode 151.

The display panel 100 further includes a spacer KB. The spacer KB is large enough to provide a certain distance between the common electrode 152 and the second electrode 251. Accordingly, the LC layer 253 with a predetermined thickness can be provided between the common electrode 152 and the second electrode 251.

Specifically, the spacer KB is large enough to provide a distance of larger than or equal to 3 µm and less than or equal to 10 µm, or preferably larger than or equal to 3.5 µm and less than or equal to 6 µm, between the common electrode 152 and the second electrode 251. When the distance is less than 3 µm, it is difficult to display an image with excellent contrast between light and dark with the use of the second display region 201. When the distance is more than 10 µm, it is difficult to display an image with a wide view angle with the use of the first display region 101. In addition, power consumed by the second display element 250 increases.

The display panel 100 includes an insulating layer 228 between the common electrode 152 and the second electrode 251. The insulating layer 228 has a function of preventing an occurrence of a short circuit defect between the second electrode 251 and the common electrode that overlaps with the spacer KB.

The display panel 100 includes the first base 110 and the second base 170. The first base 110 and the second base 170 sandwich the first display region 101 and the second display region 201. The first base 110 includes an insulating layer 110a and a support 110b, and the second base 170 includes an insulating layer 170a and a support 170b.

Individual components included in the display panel 100 will be described below. Note that these units can not be clearly distinguished and one unit also serves as another unit or include part of another unit in some cases.

For example, the common electrode 152 between the EL layer 153 and the LC layer 253 is a component that constitutes the first display element 150 and is also a component that constitutes the second display element 250.

<<Overall Structure>>

The display panel 100 includes the first display element 150, the second display element 250, the first display region 101, or the second display region 201.

The display panel 100 includes the coloring layer CF or the light-blocking layer BM.

The display panel 100 includes the pixel circuit 102C, the pixel circuit 202C, the wiring 111, the wiring 211, or the terminal portion 119.

<<First Base 110>>

The first base 110 has heat resistance high enough to withstand a manufacturing process and the thickness and size that are appropriate for manufacturing apparatus.

For example, an organic material or an inorganic material can be used for the first base 110.

For example, an organic material such as a resin, a resin film, or plastic can be used for the first base 110. Specifically, a thin film or a plate including polyester, polyolefin, polyamide, polyimide, polycarbonate, an acrylic resin, or the like can be used. Specifically, these materials can be used for the support 110b.

For example, an inorganic material such as glass, ceramic, or metal can be used for the first base 110. Specifically, a plate including non-alkali glass, soda-lime glass, potash glass, crystal glass, or the like can be used. Specifically, metal foil or a metal plate including stainless steel (SUS), aluminum, magnesium, or the like can be used. Specifically, these materials can be used for the support 110b.

For example, an inorganic oxide, an inorganic nitride, or an inorganic oxynitride can be used for the first base 110. Specifically, a thin film containing silicon oxide, silicon nitride, silicon oxynitride, alumina, or the like can be used. Specifically, these materials can be used for the insulating layer 110a.

For example, a material or a composite material of a plurality of materials can be used for the first base 110. Specifically, it is possible to use a composite material in which a plurality of materials are stacked or a composite material in which a fibrous or particulate material is dispersed in another material.

For example, a material in which a base and an insulating layer that prevents diffusion of impurities contained in the base are stacked can be used for the first base 110. Specifically, it is possible to use a material in which glass and one or more of materials that prevent diffusion of impurities contained in the glass, e.g., silicon oxide, silicon nitride, and silicon oxynitride, are stacked. It is also possible to use a material in which a resin and one or more of materials that prevent diffusion of impurities passing through the resin, such as silicon oxide, silicon nitride, and silicon oxynitride, are stacked.

For example, a composite material such as a resin film to which a metal plate, a thin glass plate, or a film of an inorganic material is attached can be used for the first base 110.

For example, if a composite material in which an inorganic film with a thickness of 10 μm or less and a resin film with a thickness of ten and several to several hundred micrometers are attached is used, the composite material can be bent with a curvature radius of 5 mm or less, preferably 4 mm or less, more preferably 3 mm or less, and particularly preferably 1 mm or less.

<<Second Base 170>>

The material that can be used for the first base 110 can be used for the second base 170. When the same material as the first base is used for the second base 170, an occurrence of curl can be suppressed.

For example, if a composite material in which an inorganic film with a thickness of 10 μm or less and a resin film with a thickness of ten and several to several hundred micrometers are attached is used, the composite material can be bent with a curvature radius of 5 mm or less, preferably 4 mm or less, more preferably 3 mm or less, particularly preferably 1 mm or less.

<<First Display Element 150>>

The first display element 150 includes the first electrode 151, the common electrode 152, and the EL layer 153, and emits light that is to go out through the common electrode 152 (see FIG. 1B).

For example, an organic electroluminescent element or the like can be used for the first display element 150.

For example, the thickness of the first display element 150 can be larger than or equal to 100 nm and smaller than or equal to 2 μm. In this case, the first display element 150 can be bent along the deformed flexible first base 110 and second base 170. Consequently, the display panel can have flexibility.

<<First Electrode 151>>

A conductive material can be used for the first electrode 151. In particular, a material which efficiently reflects light emitted from the EL layer 153 is preferable.

For example, an inorganic conductive material, an organic conductive material, a metal material, a conductive ceramic material, or the like can be used. Note that a single layer or several stacked layers can include any of the above materials.

Specifically, a metal element selected from aluminum, gold, platinum, silver, chromium, tantalum, titanium, molybdenum, tungsten, nickel, iron, cobalt, palladium, and manganese; an alloy including any of the above-described metal elements; an alloy including any of the above-described metal elements in combination; or the like can be used.

In particular, silver, aluminum, and an alloy including any of them are preferable because of their high reflectance with respect to visible light.

Alternatively, a conductive oxide such as indium oxide, indium tin oxide, indium zinc oxide, zinc oxide, or zinc oxide to which gallium is added can be used.

Alternatively, graphene or graphite can be used. The film including graphene can be formed, for example, by reducing a film containing graphene oxide. As a reducing method, a method using heat, a method using a reducing agent, or the like can be employed.

Alternatively, a conductive polymer can be used.

<<Common Electrode 152>>

A light-transmitting conductive material can be used for the common electrode 152.

For example, a material that can be used for the first electrode 151 is made thin enough to have a light-transmitting property to be used for the common electrode 152. Specifically, a metal thin film with a thickness of greater than or equal to 5 nm and less than or equal to 30 nm can be used.

Note that a single layer or several stacked layers can include the above material. Specifically, a stack of silver with a thickness of larger than or equal to 5 nm and less than or equal to 30 nm and a metal oxide layer including indium and tin can be used.

<<EL Layer 153>>

The EL layer 153 includes an organic compound that can emit fluorescence or phosphorescence. The EL layer 153 is also called a layer including a luminescent organic compound.

A structure of a single layer or stacked layers can be used for the EL layer 153.

For example, a layer including a material with a higher hole-transport property than an electron-transport property, a layer including a material with a higher electron-transport property than a hole-transport property, or the like can be used.

A plurality of layers 153 including luminescent organic compounds with different compositions can be used in a light-emitting panel. For example, the display panel 100 can include the layer 153 including a red luminescent organic compound, the layer 153 including a green luminescent organic compound, and the layer 153 including a blue luminescent organic compound.

<<Second Display Element 250>>

The second display element 250 includes the second electrode 251, the common electrode 152, and the LC layer 253, and has a function of controlling the transmission degree of light entered from the common electrode 152 or the second electrode 251. For example, the second display element 250 has a function of controlling the degree of light transmission or light scattering (see FIG. 1B). For example, a polymer dispersed liquid crystal element can be used for the display element 250.

For example, the second display element 250 has a function of controlling the transmission degree of light emitted from the first display element 150. Specifically, the second display element 250 transmits light entered from the common electrode 152 and let the light out through the second electrode 251.

Furthermore, the second display element 250 has a function of transmitting or scattering light entered from the second electrode 251. Specifically, the second display element 250 transmits light entered from the second electrode 251 and lets the light reach the common electrode 152 or the first electrode 151 of the first display element 150. The incident light is reflected by the common electrode 152 or the first electrode 151, transmitted through the second display element 250 again, and goes out through the second electrode 251.

The thickness of the second display element 250 can be, for example, greater than or equal to 3 µm and less than or equal to 30 µm. In this case, the second display element 250 can be bent along the deformed flexible first base 110 and second base 170. Consequently, the display panel 100 can have flexibility.

<<LC Layer 253>>

The LC layer 253 includes a polymer with a net-like structure and liquid crystal that is phase-separated from the polymer with a net-like structure. For example, the net-like structure with a size of larger than or equal to 550 nm and smaller than or equal to 750 nm is preferable because such a size makes it possible to efficiently cause scattering of incident visible light.

A liquid crystal material with refractive index anisotropy Δn of 0.15 or higher, preferably 0.2 or higher can be used, for example. A polymer with a refractive index roughly equivalent to that of an oriented liquid crystal material can be used.

Large refractive index anisotropy of a liquid crystal material enhances a light scattering effect, whereby the LC layer 253 can be thin. Accordingly, the drive voltage can be reduced.

When relative permittivity Δ∈ of the material is large, the drive voltage can be reduced.

The LC layer 253 can be formed by polymerizing monomers including a liquid crystal material, for example. Specifically, a composition including a liquid crystal material and monomers of higher than or equal to 20% by weight and less than 30% by weight is irradiated with ultraviolet light. The monomers irradiated with ultraviolet light are polymerized while phase-separated from the liquid crystal material, which results in formation of the LC layer 253. An acrylic material can be used for monomers, for example.

<<Second Electrode 251>>

The second electrode 251 has conductivity and a light-transmitting property. A light-transmitting conductive material can be used for the second electrode 251. For example, the same material as the common electrode 152 can be used.

<<First Display Region 101>>

The first display region 101 includes the plurality of first display elements 150. For example, the first display region 101 includes the plurality of first display elements 150 arranged in matrix.

<<Second Display Region 201>>

The second display region 201 overlaps with the first display region 101. In addition, the second display region 201 includes the plurality of second display elements 250.

For example, the second display region 201 includes the plurality of second display elements 250 arranged in matrix. The second display elements 250 can be arranged such that each of them overlaps with one of the first display elements 150 (see FIG. 1B).

<<Coloring Layer>>

The coloring layer CF has a function of transmitting light of a predetermined color.

For example, a layer transmitting red light, a layer transmitting green light, or a layer transmitting blue light can be used as the coloring layer CF. Alternatively, a layer transmitting yellow light, a layer transmitting cyan light, or a layer transmitting magenta light may be used as the coloring layer CF.

For example, a layer containing a pigment or a dye can be used as the coloring layer CF. Specifically, a polymer containing a pigment or a dye can be used for the coloring layer CF.

A plurality of coloring layers CF transmitting light with different colors can be used.

For example, the coloring layers CF transmitting light with different colors can be arranged in stripes or in a checkered pattern.

Specifically, the coloring layer CF transmitting red light, the coloring layer CF transmitting green light, and the coloring layer CF transmitting blue light can be arranged in stripes. Alternatively, the above three kinds of coloring layers CF and the coloring layer transmitting yellow light can be arranged in a matrix of two rows and two columns.

<<Light-Blocking Layer BM>>

The light-blocking layer BM has a function of suppressing visible light transmission. The light-blocking layer BM has, for example, a band-like or grid-like shape.

For example, a light-blocking material can be used for the light-blocking layer BM. A resin in which a pigment is dispersed, a resin containing a dye, or an inorganic film such as a black chromium film can be used for the light-blocking layer BM. Specifically, carbon black, an inorganic oxide, a composite oxide containing a solid solution of a plurality of inorganic oxides, or the like can be used.

<<Partition 128>>

The partition 128 has an insulation property and includes openings. The openings are arranged, for example, in stripes or in matrix. The openings can have various shapes.

For example, an insulating organic or inorganic material can be used for the partition 128.

For example, a material or a composite material of a plurality of materials can be used for the partition 128. Specifically, it is possible to use a composite material in which a plurality of materials are stacked or a composite material in which a fibrous or particulate material is dispersed in another material.

For example, an organic material such as a resin can be used for the partition 128. Specifically, a thin film containing polyester, polyolefin, polyamide, polyimide, polycarbonate, an acrylic resin, or a material containing a photosensitive polymer can be used.

For example, an inorganic oxide, an inorganic nitride, or an inorganic oxynitride can be used for the partition 128. Specifically, a thin film containing silicon oxide, silicon nitride, silicon oxynitride, alumina, or the like can be used.

Specifically, a 0.8-µm-thick polyimide can be used for the partition 128.

<<Spacer KB>>

The spacer KB is large enough to provide a predetermined distance between the common electrode 152 and the second electrode 251. Note that there is a region where the spacer KB, the light-blocking layer BM, and the partition 128 overlap with one another.

For example, an organic material, an inorganic material, or a composite material of an organic material and an inorganic material can be used for the spacer KB.

Specifically, an organic material such as a resin or plastic can be used for the spacer KB. Specifically, polyester, polyolefin, polyamide, polyimide, polycarbonate, an acrylic resin, a material containing a photosensitive polymer, or the like can be used for the spacer KB.

Specifically, an inorganic oxide, an inorganic nitride, an inorganic oxynitride, or the like can be used for the spacer KB. For example, silicon oxide, silicon nitride, silicon oxynitride, or alumina can be used for the spacer KB.

<<Insulating Layer 228>>

The insulating layer 228 is provided between the common electrode 152 and the second electrode 251, and has an insulation property. Specifically, the insulating layer 228 is provided between the common electrode 152 and the LC layer 253.

For example, an organic material, an inorganic material, or a composite material of an organic material and an inorganic material can be used for the insulating layer 228.

Specifically, an organic material such as a resin or plastic can be used for the insulating layer 228. Specifically, polyester, polyolefin, polyamide, polyimide, polycarbonate, an acrylic resin, a material containing a photosensitive polymer, or the like can be used for the insulating layer 228.

For example, an adhesive agent that attaches a process member where the first display region 101 is formed to a process member where the second electrode 251 and the LC layer 253 are formed can be used as the insulating layer 228. Specifically, an epoxy resin, an acrylic resin, or the like can be used.

<<Pixel Circuit 102C>>

The pixel circuit 102C has a function of supplying power to the first display element 150 and driving the first display element 150.

For example, the pixel circuit 102C includes a driver transistor M10, a switching element M11, and a capacitor C11, and is electrically connected to a wiring G11 that can supply a selection signal, a wiring S11 that can supply an image signal, a wiring VP that can supply a high power supply potential, and a wiring COM that can supply a low power supply potential (see FIG. 1C1). Note that the wiring G11 and the wiring S11 can be regarded as a scanning line and a signal line, respectively.

Note that the wiring COM is electrically connected to the common electrode 152, and the wiring G11 is electrically connected to the wiring 111, for example.

<<Pixel Circuit 202C>>

The pixel circuit 202C has a function of supplying power to the second display element 250 and driving the second display element 250.

For example, the pixel circuit 202C includes a switching element M21 and a capacitor C, and is electrically connected to a wiring G21 that can supply a selection signal, a wiring S21 that can supply an image signal, and the wiring COM that can supply a low power supply potential (see FIG. 1 C2).

Note that the wiring COM is electrically connected to the common electrode 152, and the wiring G21 is electrically connected to the wiring 211, for example.

<<Wiring 111, Wiring 211, Terminal Portion 119, and Terminal Portion 219>>

The wiring 111, the wiring 211, the terminal portion 119, and the terminal portion 219 include a conductive material.

For example, an inorganic conductive material, an organic conductive material, a metal material, a conductive ceramic material, or the like can be used.

Specifically, a metal element selected from aluminum, gold, platinum, silver, chromium, tantalum, titanium, molybdenum, tungsten, nickel, iron, cobalt, palladium, and manganese; an alloy including any of the above-described metal elements; an alloy including any of the above-described metal elements in combination; or the like can be used.

Alternatively, a conductive oxide such as indium oxide, indium tin oxide, indium zinc oxide, zinc oxide, or zinc oxide to which gallium is added can be used.

Alternatively, graphene or graphite can be used. The film including graphene can be formed, for example, by reducing a film containing graphene oxide. As a reducing method, a method using heat, a method using a reducing agent, or the like can be employed.

Alternatively, a conductive polymer can be used.

<Driving Method Example 1 of Display Panel>

A driving method of the display panel of one embodiment of the present invention illustrated in Structure Example 1 of Display Panel will be described with reference to FIG. 2A.

FIG. 2A is a cross-sectional view illustrating part of the structure of the display panel 100 extracted from FIG. 1B.

Specifically, part of the structure of FIG. 1B denoted by the alphabet A and the coloring layers CF in FIG. 1B are shown in FIG. 2A.

Among the three pixels, a pixel 102R has a function of exhibiting red color and includes the first display element 150 that emits light including red light and the coloring layer CF that transmits red light. A pixel 102G has a function of exhibiting green color and includes the first display element 150 that emits light including green light and the coloring layer CF that transmits green light. A pixel 102B has a function of exhibiting blue color and includes the first display element 150 that emits light including blue light and the coloring layer CF that transmits blue light.

Specifically, the first display element 150 of the pixel 102R has the EL layer 153 that can generate red light. The first display element 150 of the pixel 102G has the EL layer 153 that can generate green light. The first display element 150 of the pixel 102B has the EL layer 153 that can generate blue light.

In FIG. 2A, the pixel 102R displays a low gray level; the pixel 102G displays a high gray level with the use of external light; and the pixel 102B displays a high gray level with the use of light emitted from the display element 150.

<<Method for Displaying Low Gray Level>>

For example, the second display element 250 of the pixel 102R is set in a condition to scatter light. Specifically, an electric field applied to the LC layer 253 is controlled by voltages applied to the second electrode (not illustrated) and the common electrode 152, whereby the second display element is made to scatter light.

With such a structure, external light entered in the display panel 100 from a user side is weakened when penetrating the coloring layer CF of the pixel 102R, and is scattered in various directions in the LC layer 253. Consequently, light toward a user is decreased, and a low gray level can be displayed.

<<Method for Displaying High Gray Level with the Use of External Light>>

For example, the second display element 250 of the pixel 102G is set in a condition to transmit light. Specifically, an electric field applied to the LC layer 253 is controlled by voltages applied to the second electrode (not illustrated) and the common electrode 152, whereby the second display element is made to transmit light.

With such a structure, external light penetrates the coloring layer CF of the pixel 102G to be reflected by the first electrode 151 and then penetrates the coloring layer CF again to be ejected outside the display panel 100. Consequently, a user can view light that has penetrated twice the coloring layer CF. For example, when the coloring layer CF transmits green light, the user can view green light.

<<Method for Displaying High Gray Level with the Use of Display Element 150>>

For example, the second display element 250 of the pixel 102B is set in a condition to transmit light. Specifically, an electric field applied to the LC layer 253 is controlled by voltages applied to the second electrode (not illustrated) and the common electrode 152, whereby the second display element is made to transmit light. In addition, the first display element 150 is set in a condition to emit light. Specifically, a current is made to flow through the EL layer 153 with the use of the first electrode 151 and the common electrode 152.

With such a structure, light emitted from the first display element 150 penetrates the second display element and the coloring layer CF to be ejected outside the display panel 100. Consequently, a user can view light that has penetrated the coloring layer CF. For example, when the first display element 150 emits blue light and the coloring layer CF transmits blue light, the user can view blue light.

<Structure Example 2 of Display Panel>

Another structure of a display panel of one embodiment of the present invention will be described with reference to FIG. 16.

Figure 16:
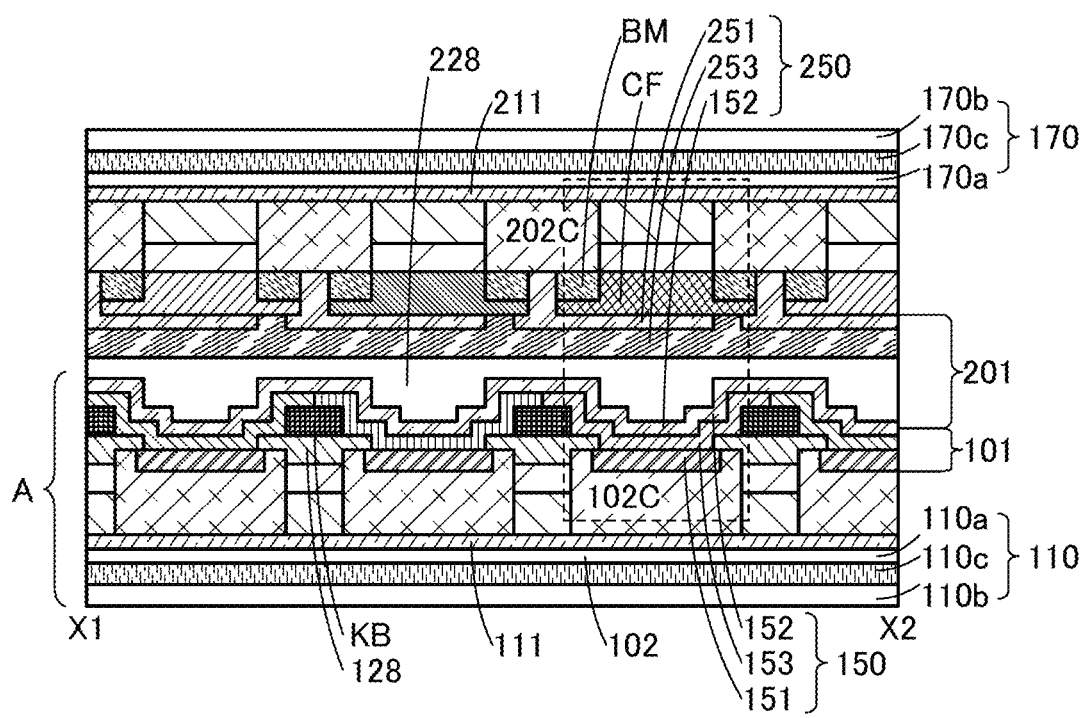
FIG. 16 illustrates a structure of a display panel of one embodiment.

FIG. 16 is a cross-sectional view illustrating a structure which is partly changed from that of the display panel 100 in FIGS. 1A to 1C2.

Specifically, the first base 110 and the second base 170 in FIG. 1B can be replaced with those shown in FIG. 16.

<<First Base 110>>

The first base 110 has flexibility. Specifically, the insulating layer 110a with a thickness of 10 µm or less, the support 110b that overlaps with the insulating layer 110a and has flexibility, and a resin layer 110c that has a function of attaching the insulating layer 110a to the support 110b can be used for the first base 110.

<<Second Base 170>>

The second base 170 has flexibility. Specifically, the insulating layer 170a with a thickness of 10 µm or less, the support 170b that overlaps with the insulating layer 170a and has flexibility, and a resin layer 170c that has a function of attaching the insulating layer 170a to the support 170b can be used for the second base 170.

<Structure Example 3 of Display Panel>

Another structure of a display panel of one embodiment of the present invention will be described with reference to FIG. 2B.

FIG. 2B is a cross-sectional view illustrating a structure which is partly changed from that of the display panel 100 in FIGS. 1A to 1C2 and a driving method thereof.

Specifically, the part of the structure denoted by the alphabet A and the coloring layers CF in FIG. 1B can be replaced with the structure shown in FIG. 2B.

Among the three pixels 102, the pixel 102R has a function of exhibiting red color and includes the coloring layer CF that transmits red light. The pixel 102G has a function of exhibiting green color and includes the coloring layer CF that transmits green light. The pixel 102B has a function of exhibiting blue color and includes the coloring layer CF that transmits blue light. Each of the pixels 102R, 102G, and 102B includes a first display element 150W that can emit white light including red, green, and blue light.

The display panel described in Structure Example 3 of Display Panel can be driven in a way similar to that of the display panel 100 illustrated in Structure Example 1 of Display Panel.

The structure here is different from the structure described with reference to FIG. 1B in that all the pixels 102R, 102G, and 102B include the first display element 150W that is capable of emitting white light including red, green, and blue light. Different structures will be described in detail below, and the above description is referred to for the other similar structures.

<<First Display Element 150W>>

The first display element 150W includes the first electrode 151, the common electrode 152, and an EL layer 153W (a layer including a luminescent organic compound), and gives off white light including red, green, and blue light that is to go out through the common electrode 152.

Note that the first electrode 151 of the display element 150W can include a material that can be used for the first electrode 151 of the first display element 150, and the common electrode 152 of the display element 150W can include a material that can be used for the common electrode 152 of the first display element 150.

<<EL Layer 153W>>

The EL layer 153W includes an organic compound that can emit fluorescence or phosphorescence, and generates white light including red, green, and blue light. The EL layer 153W is also called a layer including a luminescent organic compound.

For example, the EL layer 153W can have a structure where a layer that can generate blue light, a layer that can generate green light, and a layer that can generate red light are stacked. Alternatively, the EL layer 153W can have a structure where a layer that can generate blue light and a layer that can generate yellow light are stacked. Alternatively, the EL layer 153W can have a structure where a layer that can generate blue fluorescence and a layer that can generate yellow phosphorescence are stacked.

<Structure Example 4 of Display Panel>

Another structure of a display panel of one embodiment of the present invention will be described with reference to FIG. 2C.

FIG. 2C is a cross-sectional view illustrating a structure which is partly changed from that of the display panel 100 in FIGS. 1A to 1C2 and a driving method thereof.

Specifically, the part of the structure denoted by A and the coloring layers CF in FIG. 1B can be replaced with the structure shown in FIG. 2C.

Among the three pixels 102, the pixel 102R has a function of exhibiting red color and includes a first display element 150WR that efficiently emits light including red light and the coloring layer CF that transmits red light. The pixel 102G has a function of exhibiting green color and includes a first display element 150WG that efficiently emits light including green light and the coloring layer CF that transmits green light. A pixel 102B has a function of exhibiting blue color and includes a first display element 150WB that efficiently emits light including blue light and the coloring layer CF that transmits blue light.

In FIG. 2C, the pixel 102R displays a high gray level with the use of external light; the pixel 102G displays a low gray level; and the pixel 102B displays a high gray level with the use of light emitted from the display element 150WB.

The structure shown in FIG. 2C is different from the structure described with reference to FIG. 1B in that all the pixels 102R, 102G, and 102B include the EL layer 153W that is capable of generating white light including red, green, and blue light; a common electrode 152M has a function of transmitting part of light generated by the EL layer 153W and reflecting part thereof; and a different distance is provided between the common electrode 152M and each of the first electrodes such that light with a predetermined color is efficiently emitted. Different structures will be described in detail below, and the above description is referred to for the other similar structures.

<<First Display Element 150WB>>

For example, the first display element 150WB emitting blue light includes a first electrode 151B, the common electrode 152M, and the EL layer 153W, and emits white light rich in blue light that is to go out through the common electrode 152M. Note that the first display element 150WG that emits green light includes a first electrode 151G, and the display element 150WR that emits red light includes a first electrode 151R.

The EL layer 153W includes an organic compound that can emit fluorescence or phosphorescence, and generates white light including red, green, and blue light. Any of the materials described in Structure Example 3 of Display Panel can be used for the EL layer 153W.

The common electrode 152M reflects part of light generated by the EL layer 153W and transmits part of the light. For example, any of the materials described in Structure Example 1 of Display Panel and is thin enough to have a light-transmitting property can be used for the common electrode 152M. Specifically, a metal thin film with a thickness of larger than or equal to 5 nm and less than or equal to 30 nm can be used.

The first electrode 151B has a function of reflecting light generated by the EL layer 153W and can have a function of adjusting an optical distance.

For example, any of the materials described in Structure Example 1 of Display Panel can be used for the first electrode 151B. In particular, a metal or the like that has 90% or higher reflectance with respect to visible light is preferable.

A material in which a material reflecting visible light and a light-transmitting conductive material are stacked can be used for the first electrode 151. In the first display element 150WB that emits blue light, for example, an optical distance between the common electrode 152M and the first electrode 151B is adjusted such that blue light is efficiently extracted. Specifically, a distance is provided between the common electrode 152 and the electrode 151 such that a microresonator is formed with the common electrode 152 and the first electrode 151.

An optical distance can be adjusted by changing the thickness and the refractive index of a light-transmitting conductive material. Thus, light with a predetermined color can be emitted efficiently.

The first display element 150 including the common electrode 152 and the first electrode 151B that are arranged to form a microresonator is less likely to reflect light from the outside. Accordingly, a low gray level can be displayed.

<Driving Method Example 2 of Display Panel>

A driving method of the display panel of one embodiment of the present invention illustrated in Structure Example 3 of Display Panel will be described with reference to FIG. 2C.

<<Method for Displaying High Gray Level with the Use of External Light>>

For example, the second display element 250 of the pixel 102R is set in a condition to scatter light. Specifically, an electric field applied to the LC layer 253 is controlled by voltages applied to the second electrode (not illustrated) and the common electrode 152, whereby the second display element is made to scatter light.

With such a structure, external light entering the display panel from a user side penetrates the coloring layer CF, and is scattered in various directions in the LC layer 253. Then, the light penetrates the coloring layer CF again to be ejected outside the display panel. Consequently, a user can view light that has penetrated twice the coloring layer CF. For example, when the coloring layer CF transmits red light, the user can view red light.

<<Method for Displaying Low Gray Level>>

For example, the second display element 250 of the pixel 102G is set in a condition to transmit light. Specifically, an electric field applied to the LC layer 253 is controlled by voltages applied to the second electrode (not illustrated) and the common electrode 152, whereby the second display element is made to transmit light.

Light that has penetrated the coloring layer CF reaches the first display element 150WG that is adjusted to efficiently emit green light. At the first display element 150WG in which a microresonator is formed with the common electrode 152M and the first electrode 151B, reflection of light entered form outside is suppressed. Consequently, light going to a user of the display panel 100 is decreased, and display can be performed at a low gray level.

<<Method for Displaying High Gray Level with the Use of Display Element 150>>

For example, the second display element 250 of the pixel 102B is set in a condition to transmit light. Specifically, an electric field applied to the LC layer 253 is controlled by voltages applied to the second electrode (not illustrated) and the common electrode 152, whereby the second display element is made to transmit light. In addition, the first display element 150WB is set in a condition to emit light. Specifically, a current is made to flow through the EL layer 153W with the use of the first electrode 151B and the common electrode 152M.

With such a structure, light emitted from the first display element 150WB penetrates the second display element and the coloring layer CF to be ejected outside the display panel. Consequently, a user can view light that has penetrated the coloring layer CF. For example, when the first display element 150WB emits blue light and the coloring layer CF transmits blue light, the user can view blue light.

This embodiment can be combined with any of the other embodiments in this specification as appropriate.

Embodiment 2

In this embodiment, a structure of a data processing device of one embodiment of the present invention will be described with reference to FIG. 3.

Figure 3:
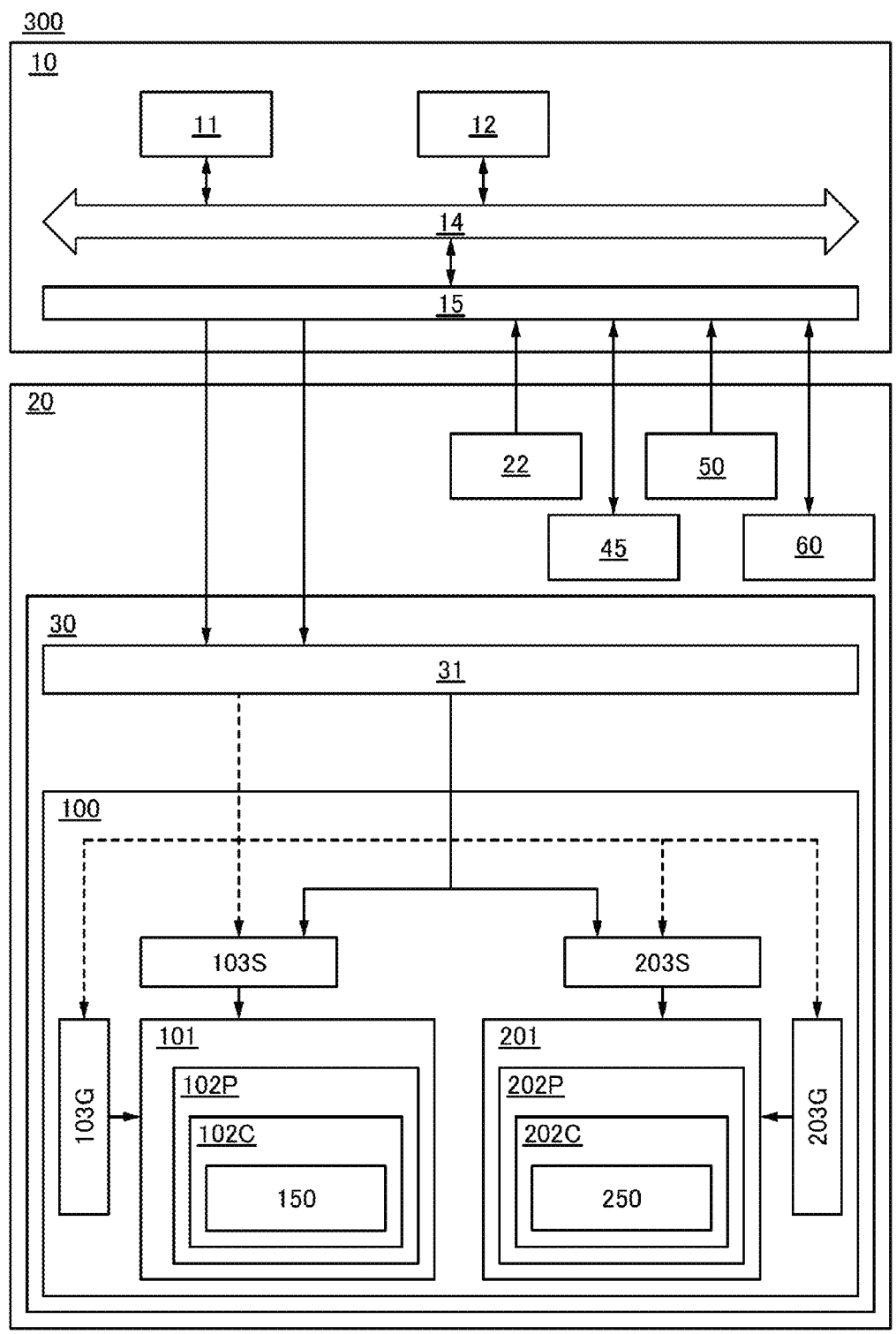
FIG. 3 is a block diagram illustrating a data processing device of one embodiment.

FIG. 3 is a block diagram illustrating a structure of a data processing device 300 of one embodiment of the present invention.

<Structure Example of Data Processing Device>

The data processing device 300 described in this embodiment includes an input/output device 20 and an arithmetic device 10.

The input/output device 20 has a function of supplying sensing data and receiving image data.

The arithmetic device 10 has a function of receiving sensing data and supplying image data.

The input/output device 20 includes a display device 30 and a sensing portion 50 having a function of sensing illuminance under usage environment of the display device 30 and supplying the sensing data including data of the illuminance.

The display device 30 includes, for example, the display panel 100 described in Embodiment 1.

The arithmetic device 10 includes an arithmetic portion 11 and a memory portion 12 that stores a program to be executed in the arithmetic portion 11.

The program includes a step for making the first display region 101 display image data and making light transmittance of the second display region 201 high when the sensing data includes data of illuminance less than predetermined illuminance, and a step for making the second display region 201 display the image data when the sensing data includes data of illuminance more than or equal to the predetermined illuminance.

The data processing device 300 described in this embodiment includes: the display device 30 which includes the display panel 100 described in Embodiment 1 and is supplied with the image data; the sensing portion 50 sensing illuminance under usage environment of the display device 30 and supplying the sensing data; and the arithmetic device 10 that makes the first display region 101 display the image data and makes light transmittance of the second display region 201 high when the sensing data includes data of the illuminance less than predetermined illuminance, and that makes the second display region 201 display the image data when the sensing data includes data of the illuminance more than or equal to the predetermined illuminance. With such a structure, the image data can be displayed on the first display region or the second display region depending on the illuminance under usage environment of the display device. Thus, the novel data processing device can be highly convenient or reliable.

In addition, the novel display panel would consume less power when used under external light.

The input/output device 20 includes an operation portion 22 supplying an operation instruction, an input/output portion 45 from/into which various input/output data is transmitted, and a communication portion 60 from/into which various communication data is transmitted.

The display device 30 includes a control portion 31 that is supplied with a primary control signal and primary image data and supplies a secondary control signal and secondary image data.

In addition, the display panel 100 includes a driver circuit 103G that is supplied with a secondary control signal and supplies a selection signal, a driver circuit 103S that is supplied with secondary image data and supplies an image signal to each row, a driver circuit 203G that is supplied with a secondary control signal and supplies a selection signal, and a driver circuit 203S that is supplied with secondary image data and supplies an image signal to each row.

The display panel 100 includes the first display region 101 including a plurality of pixels 102P and the second display region 201 including a plurality of pixels 202P. Note that the pixels 202P overlap with the pixels 102P.

The pixel 102P includes the first display element 150 and the pixel circuit 102C for driving the first display element 150.

The pixel 202P includes the second display element 250 and the pixel circuit 202C for driving the second display element 250.

The arithmetic device 10 includes an input/output interface 15 and a transmission path 14 that is supplied with and supplies data.

The following describes components included in the data processing device 300. Note that these units can not be clearly distinguished and one unit also serves as another unit or include part of another unit in some cases.

<<Overall Structure>>

The data processing device 300 includes the input/output device 20 or the arithmetic device 10.

<<Input/Output Device 20>>

The input/output device 20 includes the display device 30, the sensing portion 50, the operation portion 22, the input/output portion 45, or the communication portion 60.

<<Display Device 30>>

The display device 30 includes the control portion 31 or the display panel 100.

<<Control Portion 31>>

The control portion 31 has a function of receiving a primary control signal and primary image data, and supplying a secondary control signal and secondary image data.

For example, a clock signal or a timing signal can be used for a primary control signal.

A secondary control signal is a signal for controlling operation of the driver circuit 103G, the driver circuit 103S, the driver circuit 203G, or the driver circuit 203S, for example. Specifically, a start pulse signal, a latch signal, a pulse-width control signal, or a clock signal can be used as the secondary control signal.

Moving image data or still image data can be used for primary image data, for example.

For example, a signal whose amplitude is a value obtained by subtracting a reference potential from primary image data and whose polarity is inverted frame by frame can be used for secondary image data.

Specifically, a signal whose polarity is inverted frame by frame is supplied to the second display region 201, and a signal whose polarity is not inverted is supplied to the first display region 101.

Various semiconductor elements and electronic elements can be used for the control portion 31.

<<Display Panel 100>>

The display panel 100 includes the first display region 101, the second display region 201, the driver circuit 103G, the driver circuit 203G, the driver circuit 103S, or the driver circuit 203S.

<<First Display Region 101>>

The first display region 101 includes a plurality of scan lines extended in a row direction, a plurality of signal lines extended in a column direction, and the pixels 102P each of which is electrically connected to one of the scan lines and one of the signal lines.

The pixel 102P includes the first display element 150 and the pixel circuit 102C for driving the first display element 150.

The pixel circuit 102C is supplied with a selection signal by one scan line, and is supplied with an image signal by one signal line.

<<Second Display Region 201>>

The second display region 201 includes a plurality of scan lines extended in a row direction, a plurality of signal lines extended in a column direction, and pixels 202P each of which is electrically connected to one of the scan lines and one of the signal lines.

The pixel 202P includes the second display element 250 and the pixel circuit 202C for driving the second display element 250.

The pixel circuit 202C is supplied with a selection signal by one scan line, and is supplied with an image signal by one signal line.

<<Driver Circuit 103G and Driver Circuit 203G>>

The driver circuit 103G sequentially selects the plurality of scan lines one by one and supplies a selection signal to the selected scan line.

The driver circuit 203G sequentially selects the plurality of scan lines one by one and supplies a selection signal to the selected scan line.

The driver circuit 103G can operate switching the frequency of selecting one of the scan lines and supplying a selection signal to the selected one. For example, the driver circuit 103G has a function of operating in a first mode where selection signals are supplied at a predetermined frequency or in a second mode where selection signals are supplied at a frequency lower than that of the first mode.

The driver circuit 203G can operate switching the frequency of selecting one of the scan lines and supplying a selection signal to the selected one. For example, the driver circuit 203G has a function of operating in a first mode where selection signals are supplied at a predetermined frequency or in a second mode where selection signals are supplied at a frequency lower than that of the first mode.

Specifically, in the first mode, scan lines are selected one by one and selection signals are supplied at a frequency of 30 Hz (30 times per one second), preferably more than or equal to 60 Hz (60 times per one second) and less than 960 Hz (960 times per one second). In addition, in the second mode, scan lines are selected one by one and selection signals are supplied at a frequency of more than or equal to 11.6 µHz (a time per one day) and less than 0.1 Hz (0.1 time per one second), preferably more than or equal to 0.28 mHz (a time per one hour) and less than 1 Hz (a time per one second).

For example, the first mode and the second mode can be switched in accordance with a mode switching signal included in a secondary control signal supplied from the control portion 31.

Alternatively, operation can be performed in the first mode or the second mode in accordance with a start pulse which is supplied from the control portion 31 at different frequencies.

A plurality of driver circuits that can supply selection signals can be used. For example, the first display region 101 may be divided into several parts and one of the parts may be driven with one driver circuit. Those parts may be driven in different modes.

For example, one of the parts may display a moving image with the use of one driver circuit operating in the first mode while another of the parts may display a still image with the use of another driver circuit operating in the second mode. Alternatively, other driver circuits may be stopped while one driver circuit drives. Accordingly, power consumption can be reduced.

The driver circuit 103G and the driver circuit 203G can be formed using, for example, any of a variety of sequential circuits such as a shift register.

An electronic element formed in the same process as that for the transistors or the like included in the pixel circuit 102C can be used for the driver circuit 103G. An electronic element formed in the same process as for the transistors or the like included in the pixel circuit 202C can be used for the driver circuit 203G.

<<Driver Circuit 103S and Driver Circuit 203S>>

The driver circuit 103S is supplied with secondary image data, and supplies image signals to the plurality of pixels electrically connected to the scan line supplied with a selection signal.

The driver circuit 103S and the driver circuit 203S can be formed using, for example, any of a variety of sequential circuits such as a shift register.

An electronic element formed in the same process as that for the transistors or the like included in the pixel circuit 102C can be used for the driver circuit 103S. An electronic element formed in the same process as for the transistors or the like included in the pixel circuit 202C can be used for the driver circuit 203S.

Alternatively, a transistor formed in a different process from that for the transistors included in the pixel circuit 102C can be used for the driver circuit 103S. A transistor formed in a different process from that for the transistors included in the pixel circuit 202C can be used for the driver circuit 203S.

<<Transistor>>

Various transistors can be used in the pixel circuit 102C, the pixel circuit 202C, the driver circuit 103G, the driver circuit 203G, the driver circuit 103S, or the driver circuit 203S.

For example, a transistor in which a Group 14 element, a compound semiconductor, an oxide semiconductor, or the like is used for the semiconductor layer can be used. Specifically, a semiconductor containing silicon, a semiconductor containing gallium arsenide, an oxide semiconductor containing indium, or the like can be used for semiconductor layers of the transistors.

For example, single crystal silicon, polysilicon, amorphous silicon, or the like can be used for the semiconductor layers of the transistors.

For example, a bottom-gate transistor, a top-gate transistor, or the like can be used.

In particular, when a transistor with an extremely low off-state current is used in the pixel circuit 102C or the pixel circuit 202C, a period when the pixel circuit 102C or 202C can retain an image signal can be lengthened. Accordingly, the frequency of supplying selection signals in the second mode can be reduced. Consequently, the data processing device would consume less power.

For example, a transistor whose semiconductor layer includes an oxide semiconductor can be used in the pixel circuit 102C or the pixel circuit 202C. Specifically, the semiconductor layer can favorably include an oxide semiconductor including a material represented by an In—M-Zn oxide that contains at least indium (In), zinc (Zn), and M (M is a metal such as Al, Ga, Ge, Y, Zr, Sn, La, Ce, or Hf). Alternatively, both In and Zn are preferably contained.

As an oxide semiconductor included in an oxide semiconductor layer, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—

Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, the oxide semiconductor having a structure described in Embodiment 3 in detail can be used in the display panel of one embodiment of the present invention.

<<Sensing Portion 50>>

The sensing portion 50 has a function of sensing illuminance under usage environment of the display device 30, and supplying sensing data including data of the illuminance.

For example, the sensing portion 50 can include a sensor circuit that supplies data of illuminance under environment in accordance with a photoelectric conversion element and a signal supplied from the photoelectric conversion element.

Specifically, a photodiode, a CCD image sensor, a CMOS image sensor, or the like can be used for the sensing portion 50.

<<Operation Portion 22>>

The operation portion 22 receives various operations from a user and supplies operation instructions. For example, a keyboard, a touch sensor, or a pointing device can be included in the operation portion 22.

Specifically, a user supplies positional data to the arithmetic device 10 by the finger or palm put closer to the touch sensor. The arithmetic device 10 can supply a related operation instruction in accordance with the supplied positional data. For example, an operation instruction including an instruction to terminate a program can be supplied.

<<Input/Output Portion 45>>

The input/output portion 45 supplies and is supplied with various kinds of data.

For the input/output portion 45, for example, a camera, a microphone, a read-only external memory portion, an external memory portion, a scanner, a speaker, or a printer can be used.

Specifically, a digital camera, a digital video camera, or the like can be used for the input/output portion 45.

An external memory portion, such as a hard disk or a removable memory, can be used for the input/output portion 45. A read-only external storage portion, such as a CD-ROM or a DVD-ROM, can be used for the input/output portion. Note that an external storage portion can store data of an electronic book or the like.

<<Communication Portion 60>>

The communication portion 60 has a function of supplying data supplied from the arithmetic device 10 to a device or a communication network outside the data processing device 300. In addition, the communication portion 60 has a function of supplying data obtained from a device or a communication network outside to the arithmetic device 10. For example, the communication portion 60 can supply data to the Internet, or obtain data from the Internet.

Note that voice data, image data, various operation instructions, or the like can be used as the data.

A communication means for connecting to a device or a communication network outside can be used. A hub, a router, a modem, or the like can be used for the communication portion 60. A method with or without a wire can be used as a method for connecting to a device or a communication network outside. Specifically, radio waves, infrared rays, or the like can be used.

<<Arithmetic Device 10>>

The arithmetic device 10 includes the arithmetic portion 11, the memory portion 12, the transmission path 14, or the input/output interface 15.

For example, the arithmetic device 10 has a function of supplying data containing an image for operation by a user of the data processing device 300.

<<Arithmetic Portion>>

The arithmetic portion 11 executes a program stored in the memory portion 12. For example, when supplied with positional data contained in a region on which an image for user operation is displayed, the arithmetic portion 11 has a function of supplying an operation instruction associated in advance with the image.

<<Memory Portion>>

The memory portion 12 has a function of storing a program to be executed by the arithmetic portion 11.

<<Input/Output Interface and Transmission Path>>

The input/output interface 15 has a function of supplying and receiving data. For example, the input/output interface 15 is supplied with data from the transmission path 14 or the input/output device 20. Furthermore, the transmission path 14 or the input/output device 20 is supplied with data from the input/output interface 15.

The transmission path 14 has a function of supplying and receiving data. For example, the transmission path 14 is supplied with data from the arithmetic portion 11, the memory portion 12, and the input/output interface 15. In addition, the arithmetic portion 11, the memory portion 12, and the input/output interface 15 are supplied with data from the transmission path 14.

This embodiment can be combined with any of the other embodiments in this specification as appropriate.

Embodiment 3

In this embodiment, a structure of an oxide semiconductor that can be used in the display panel of one embodiment of the present invention will be described with reference to FIGS. 8A to 8D, FIGS. 9A to 9D, FIGS. 10A to 10C, FIGS. 11A and 11B, FIG. 12, FIGS. 13A and 13B, FIGS. 14A to 14C, and FIGS. 15A to 15D.

FIGS. 8A to 8D are Cs-corrected high-resolution TEM images of a cross section of a CAAC-OS and a cross-sectional schematic view of the CAAC-OS.

FIGS. 9A to 9D are Cs-corrected high-resolution TEM images of a plane of a CAAC-OS.

Figure 10A:
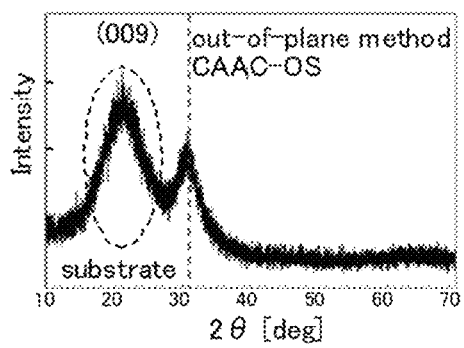
FIGS. 10A to 10C show structural analysis of a CAAC-OS and a single crystal oxide semiconductor by XRD.
Figure 10B:
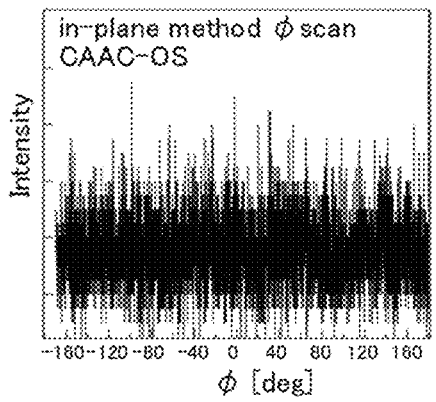
Figure 10C:
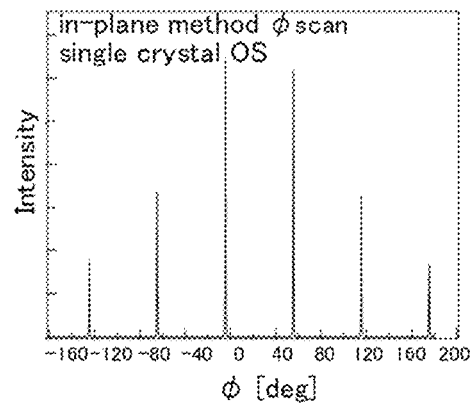

FIGS. 10A to 10C show structural analysis of a CAAC-OS and a single crystal oxide semiconductor by XRD.

Figure 11A:
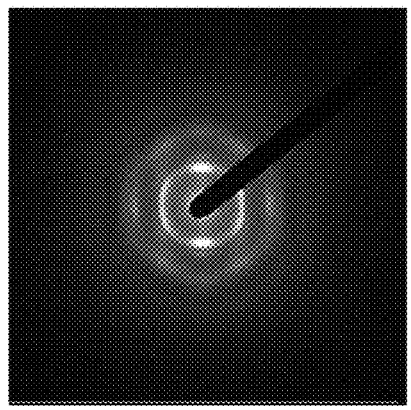
FIGS. 11A and 11B show electron diffraction patterns of a CAAC-OS.
Figure 11B:
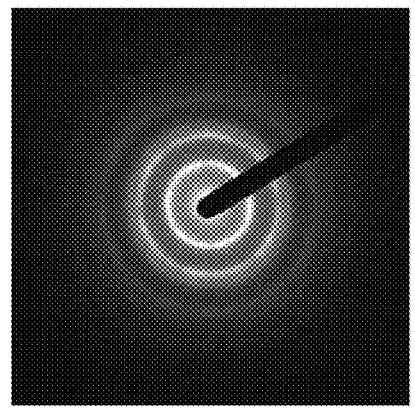

FIGS. 11A and 11B show electron diffraction patterns of a CAAC-OS.

Figure 12:
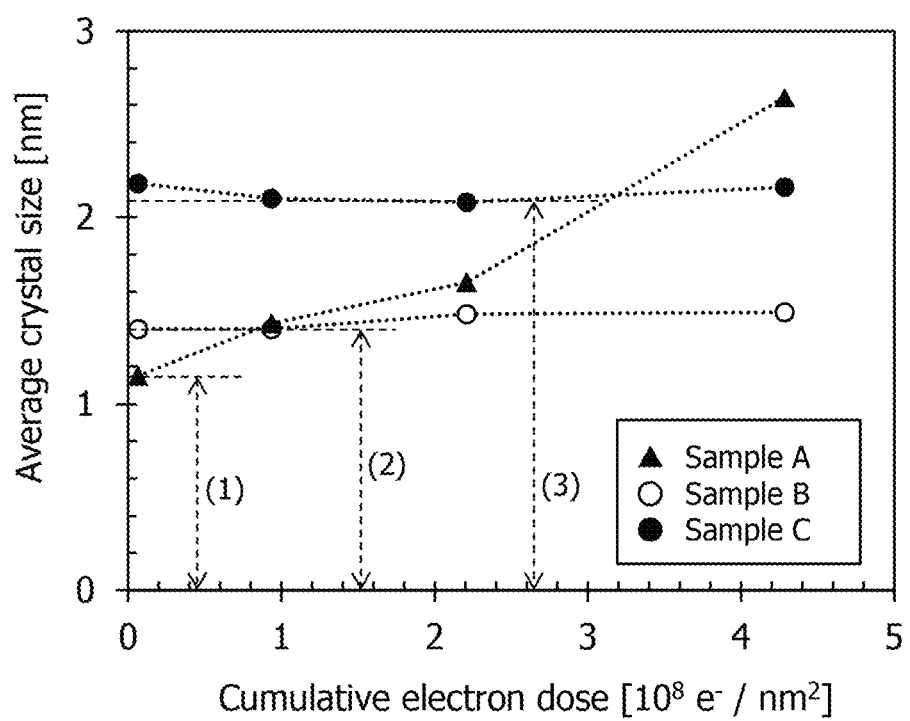
FIG. 12 shows a change of crystal parts of an In—Ga—Zn oxide owing to electron irradiation.

FIG. 12 shows a change of crystal parts of an In—Ga—Zn oxide owing to electron irradiation.

Figure 13A:
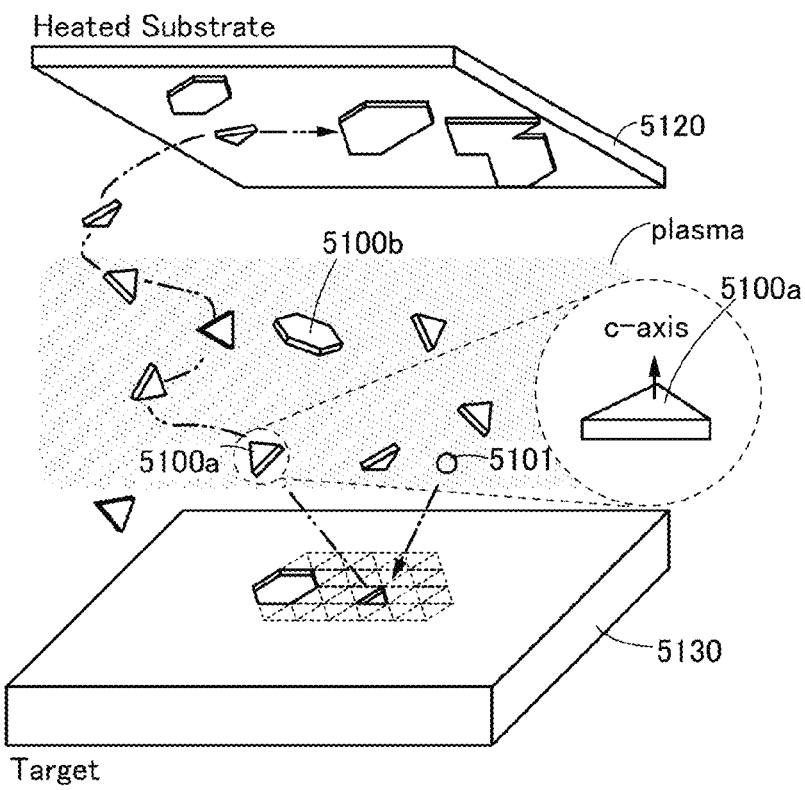
FIGS. 13A and 13B are schematic views showing deposition models of a CAAC-OS and an nc-OS.
Figure 13B:
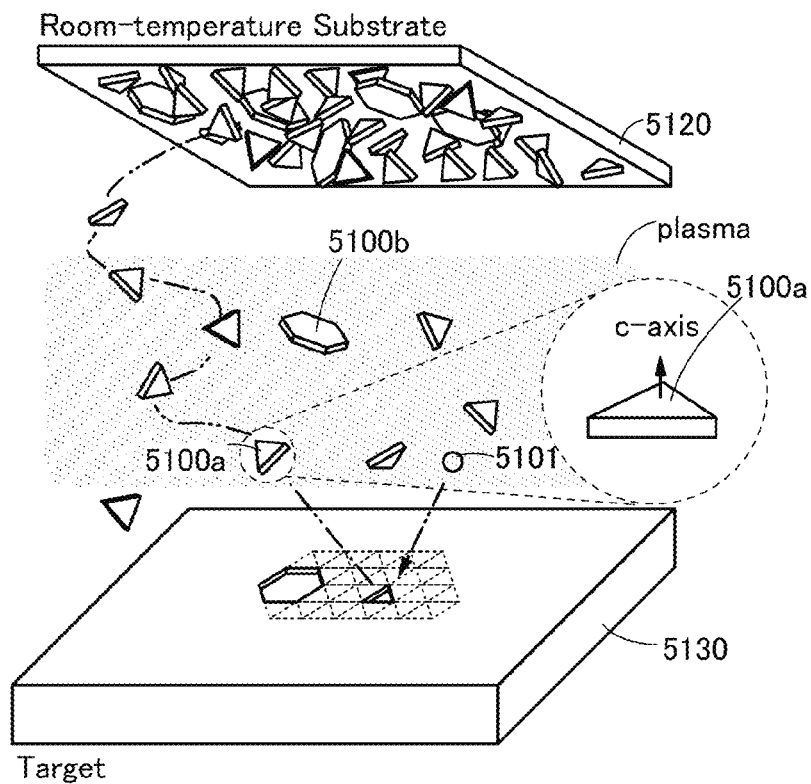
Figure 14A:
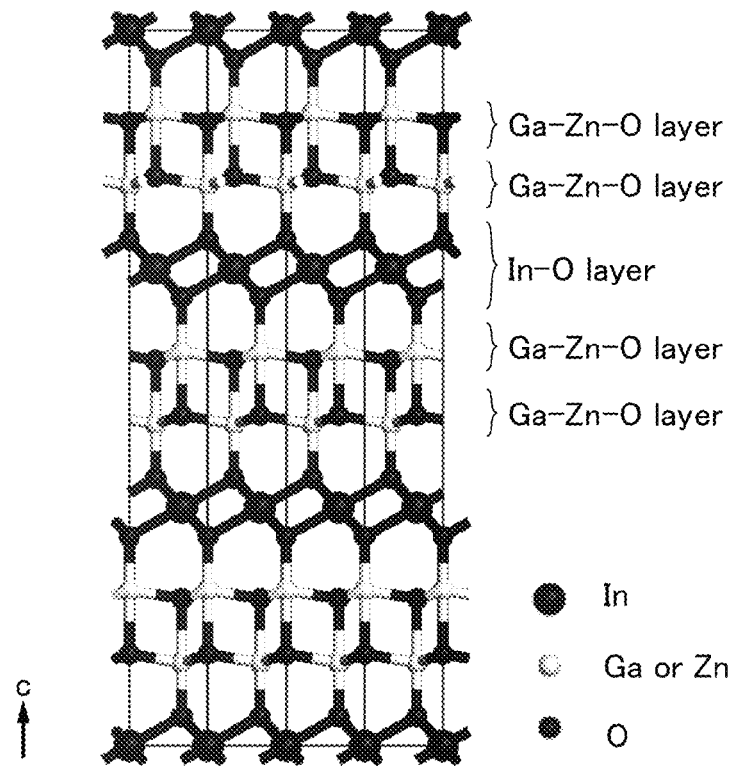
FIGS. 14A to 14C show an InGaZnO$_4$ crystal and a pellet.
Figure 14B:
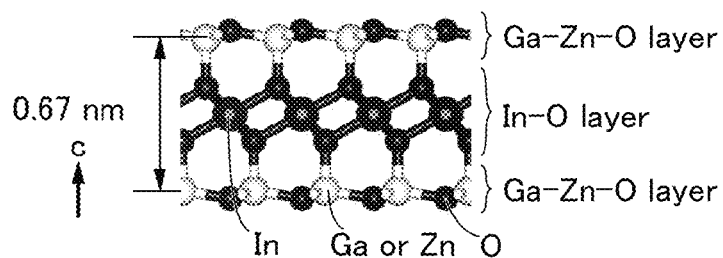
Figure 14C:
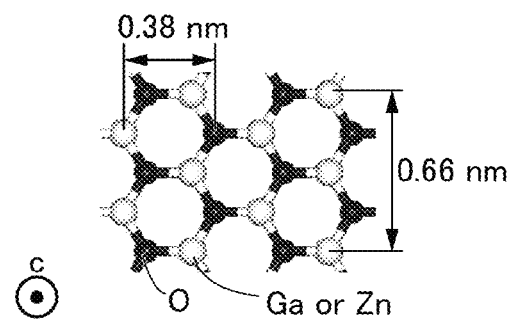

FIGS. 13A and 13B are schematic diagrams illustrating deposition models of a CAAC-OS and an nc-OS;

FIGS. 14A to 14C show an InGaZnO$_4$ crystal and a pellet.

FIGS. 15A to 15D are schematic views showing a deposition model of a CAAC-OS.

In this specification, the term "parallel" indicates that the angle formed between two straight lines is greater than or equal to −10° and less than or equal to 10°, and accordingly also includes the case where the angle is greater than or equal to −5° and less than or equal to 5°. A term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. A term "substantially perpendicular" indicates that the angle formed between two straight lines is greater than or equal to 60° and less than or equal to 120°.

In this specification, trigonal and rhombohedral crystal systems are included in a hexagonal crystal system.

<Structure of Oxide Semiconductor>

The structure of an oxide semiconductor is described below.

An oxide semiconductor is classified into, for example, a non-single-crystal oxide semiconductor and a single crystal oxide semiconductor. Alternatively, an oxide semiconductor is classified into, for example, a crystalline oxide semiconductor and an amorphous oxide semiconductor.

Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor. In addition, examples of a crystalline oxide semiconductor include a single crystal oxide semiconductor, a CAAC-OS, a polycrystalline oxide semiconductor, and a microcrystalline oxide semiconductor.

First, a CAAC-OS is described.

A CAAC-OS is one of oxide semiconductors having a plurality of c-axis aligned crystal parts (also referred to as pellets).

In a combined analysis image (also referred to as a high-resolution TEM image) of a bright-field image and a diffraction pattern of a CAAC-OS, which is obtained using a transmission electron microscope (TEM), a plurality of pellets can be observed. However, even in the high-resolution TEM image, a boundary between pellets, that is, a grain boundary is not clearly observed. Thus, in the CAAC-OS, a reduction in electron mobility due to the grain boundary is less likely to occur.

Figure 8A:
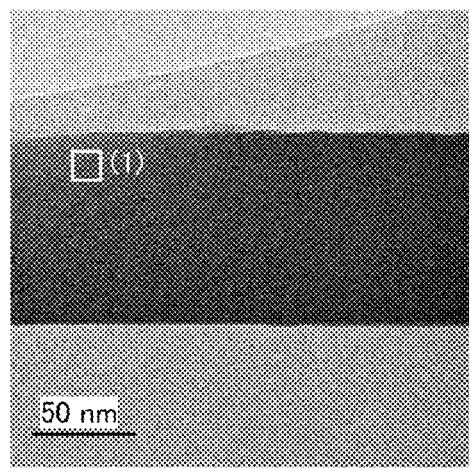
FIGS. 8A to 8D are Cs-corrected high-resolution TEM images of a cross section of a CAAC-OS and a cross-sectional schematic view of the CAAC-OS.

FIG. 8A shows an example of a high-resolution TEM image of a cross section of the CAAC-OS which is obtained from a direction substantially parallel to the sample surface. Here, the TEM image is obtained with a spherical aberration corrector function. The high-resolution TEM image obtained with a spherical aberration corrector function is particularly referred to as a Cs-corrected high-resolution TEM image in the following description. Note that the Cs-corrected high-resolution TEM image can be obtained with, for example, an atomic resolution analytical electron microscope JEM-ARM200F manufactured by JEOL Ltd.

Figure 8B:
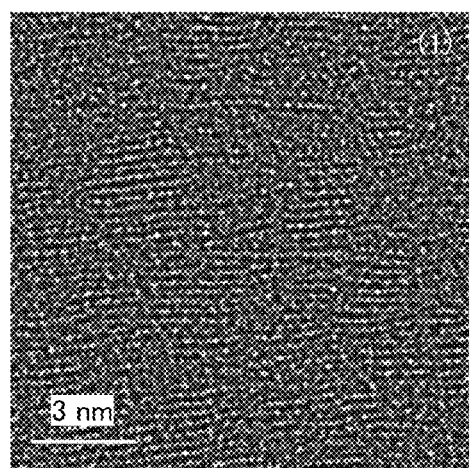

FIG. 8B is an enlarged Cs-corrected high-resolution TEM image of a region (1) in FIG. 8A. FIG. 8B shows that metal atoms are arranged in a layered manner in a pellet. Each metal atom layer has a configuration reflecting unevenness of a surface over which the CAAC-OS is formed (hereinafter, the surface is referred to as a formation surface) or a top surface of the CAAC-OS, and is arranged parallel to the formation surface or the top surface of the CAAC-OS.

Figure 8C:
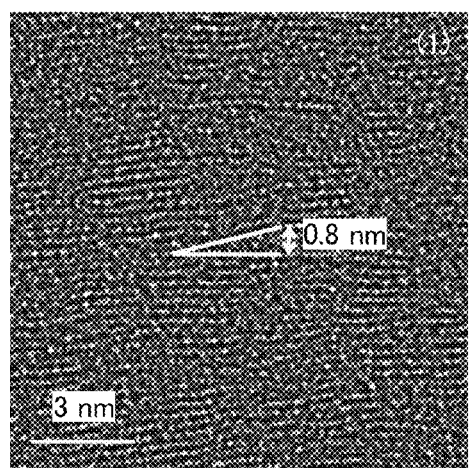

As shown in FIG. 8B, the CAAC-OS has a characteristic atomic arrangement. The characteristic atomic arrangement is denoted by an auxiliary line in FIG. 8C. FIGS. 8B and 8C prove that the size of a pellet is approximately 1 nm to 3 nm, and the size of a space caused by tilt of the pellets is approximately 0.8 nm. Therefore, the pellet can also be referred to as a nanocrystal (nc).

Figure 8D:
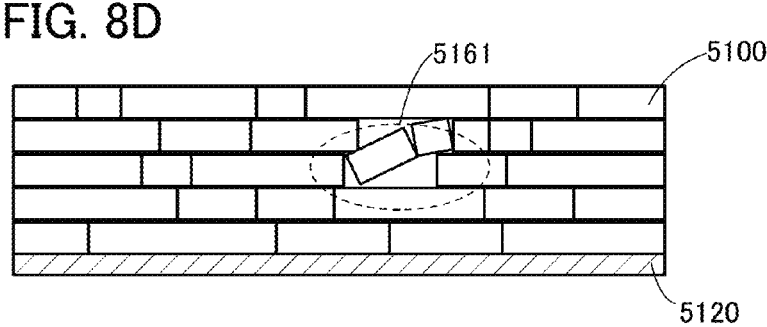

Here, according to the Cs-corrected high-resolution TEM images, the schematic arrangement of pellets 5100 of a CAAC-OS over a substrate 5120 is illustrated by such a structure in which bricks or blocks are stacked (see FIG. 8D). The part in which the pellets are tilted as observed in FIG. 8C corresponds to a region 5161 shown in FIG. 8D.

For example, as shown in FIG. 9A, a Cs-corrected high-resolution TEM image of a plane of the CAAC-OS obtained from a direction substantially perpendicular to the sample surface is observed. FIGS. 9B, 9C, and 9D are enlarged Cs-corrected high-resolution TEM images of regions (1), (2), and (3) in FIG. 9A, respectively. FIGS. 9B, 9C, and 9D indicate that metal atoms are arranged in a triangular, quadrangular, or hexagonal configuration in a pellet. However, there is no regularity of arrangement of metal atoms between different pellets.

For example, when the structure of a CAAC-OS film including an $InGaZnO_4$ crystal is analyzed by an out-of-plane method using an X-ray diffraction (XRD) apparatus, a peak appears at a diffraction angle (2θ) of around 31° as shown in FIG. 10A. This peak is derived from the (009) plane of the $InGaZnO_4$ crystal, which indicates that crystals in the CAAC-OS have c-axis alignment, and that the c-axes are aligned in a direction substantially perpendicular to the formation surface or the top surface of the CAAC-OS.

Note that in structural analysis of the CAAC-OS including an $InGaZnO_4$ crystal by an out-of-plane method, another peak may appear when 2θ is around 36°, in addition to the peak at 2θ of around 31°. The peak of 2θ at around 36° indicates that a crystal having no c-axis alignment is included in part of the CAAC-OS. It is preferable that in the CAAC-OS, a peak of 2θ appear at around 31° and a peak of 2θ not appear at around 36°.

On the other hand, in structural analysis of the CAAC-OS by an in-plane method in which an X-ray is incident on a sample in a direction substantially perpendicular to the c-axis, a peak appears when 2θ is around 56°. This peak is derived from the (110) plane of the $InGaZnO_4$ crystal. In the case of the CAAC-OS, when analysis (φ scan) is performed with 2θ fixed at around 56° and with the sample rotated about a normal vector of the sample surface as an axis (φ axis), as shown in FIG. 10B, a peak is not clearly observed. In contrast, in the case of a single crystal oxide semiconductor of $InGaZnO_4$, when φ scan is performed with 2θ fixed at around 56°, six peaks which are derived from crystal planes equivalent to the (110) plane are observed (see FIG. 10C). Accordingly, the structural analysis using XRD shows that the directions of a-axes and b-axes are irregularly oriented in the CAAC-OS.

Next, FIG. 11A shows a diffraction pattern (also referred to as a selected-area transmission electron diffraction pattern) obtained in such a manner that an electron beam with a probe diameter of 300 nm is incident on an In—Ga—Zn oxide that is a CAAC-OS in a direction parallel to the sample surface. As shown in FIG. 11A, for example, spots derived from the (009) plane of an $InGaZnO_4$ crystal are observed. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 11B shows a diffraction pattern obtained in such a manner that an electron beam with a probe diameter of 300 nm is incident on the same sample in a direction perpendicular to the sample surface. As shown in FIG. 11B, a ring-like diffraction pattern is observed. Thus, the electron diffraction also indicates that the a-axes and b-axes of the pellets included in the CAAC-OS do not have regular alignment. The first ring in FIG. 11B is considered to be derived from the (010) plane, the (100) plane, and the like of the $InGaZnO_4$ crystal. The second ring in FIG. 11B is considered to be derived from the (110) plane and the like.

Since the c-axes of the pellets (nanocrystals) are aligned in a direction substantially perpendicular to the formation surface or the top surface in the above manner, the CAAC-OS can also be referred to as an oxide semiconductor including c-axis aligned nanocrystals (CANC).

The CAAC-OS is an oxide semiconductor with a low impurity concentration. The impurity means an element other than the main components of the oxide semiconductor, such as hydrogen, carbon, silicon, or a transition metal element. An element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity. Additionally, the impurity contained in the oxide semiconductor might serve as a carrier trap or a carrier generation source.

Moreover, the CAAC-OS is an oxide semiconductor having a low density of defect states. For example, oxygen vacancies in the oxide semiconductor serve as carrier traps or serve as carrier generation sources when hydrogen is captured therein.

In a transistor using the CAAC-OS, change in electrical characteristics due to irradiation with visible light or ultraviolet light is small.

Next, a microcrystalline oxide semiconductor is described.

A microcrystalline oxide semiconductor has a region in which a crystal part is observed and a region in which a crystal part is not observed clearly in a high-resolution TEM image. In most cases, the size of a crystal part included in the microcrystalline oxide semiconductor is greater than or equal to 1 nm and less than or equal to 100 nm, or greater than or equal to 1 nm and less than or equal to 10 nm. An oxide semiconductor including a nanocrystal that is a microcrystal with a size greater than or equal to 1 nm and less than or equal to 10 nm, or a size greater than or equal to 1 nm and less than or equal to 3 nm is specifically referred to as a nanocrystalline oxide semiconductor (nc-OS). In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not observed. Accordingly, in some cases, the nc-OS cannot be distinguished from an amorphous oxide semiconductor, depending on an analysis method. For example, when the nc-OS is subjected to structural analysis by an out-of-plane method with an XRD apparatus using an X-ray having a diameter larger than the size of a pellet, a peak which shows a crystal plane does not appear. Furthermore, a diffraction pattern like a halo pattern is observed when the nc-OS is subjected to electron diffraction using an electron beam with a probe diameter (e.g., 50 nm or larger) that is larger than the size of a pellet (the electron diffraction is also referred to as selected-area electron diffraction). Meanwhile, spots appear in a nanobeam electron diffraction pattern of the nc-OS when an electron beam having a probe diameter close to or smaller than the size of a pellet is applied. Moreover, in a nanobeam electron diffraction pattern of the nc-OS, regions with high luminance in a circular (ring) pattern are shown in some cases. Also in a nanobeam electron diffraction pattern of the nc-OS, a plurality of spots is shown in a ring-like region in some cases.

Since there is no regularity of crystal orientation between the pellets (nanocrystals) as mentioned above, the nc-OS can also be referred to as an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an amorphous oxide semiconductor. Note that there is no regularity of crystal orientation between different pellets in the nc-OS. Therefore, the nc-OS has a higher density of defect states than the CAAC-OS.

Next, an amorphous oxide semiconductor is described.

The amorphous oxide semiconductor is such an oxide semiconductor having disordered atomic arrangement and no crystal part. For example, the amorphous oxide semiconductor does not have a specific state as in quartz.

In a high-resolution TEM image of the amorphous oxide semiconductor, crystal parts cannot be found.

When the amorphous oxide semiconductor is subjected to structural analysis by an out-of-plane method with an XRD apparatus, a peak which shows a crystal plane does not appear. A halo pattern is observed when the amorphous oxide semiconductor is subjected to electron diffraction. Furthermore, a spot is not observed and a halo pattern appears when the amorphous oxide semiconductor is subjected to nanobeam electron diffraction.

There are various understandings of an amorphous structure. For example, a structure whose atomic arrangement does not have ordering at all is called a completely amorphous structure. Meanwhile, a structure which has ordering until the nearest neighbor atomic distance or the second-nearest neighbor atomic distance but does not have long-range ordering is also called an amorphous structure. Therefore, the strictest definition does not permit an oxide semiconductor to be called an amorphous oxide semiconductor as long as even a negligible degree of ordering is present in an atomic arrangement. At least an oxide semiconductor having long-term ordering cannot be called an amorphous oxide semiconductor. Accordingly, because of the presence of a crystal part, for example, a CAAC-OS and an nc-OS cannot be called an amorphous oxide semiconductor or a completely amorphous oxide semiconductor.

Note that an oxide semiconductor may have a structure having physical properties between the nc-OS and the amorphous oxide semiconductor. The oxide semiconductor having such a structure is specifically referred to as an amorphous-like oxide semiconductor (a-like OS).

In a high-resolution TEM image of the a-like OS, a void may be observed. Furthermore, in the high-resolution TEM image, there are a region where a crystal part is clearly observed and a region where a crystal part is not observed.

A difference in effect of electron irradiation between structures of an oxide semiconductor is described below.

An a-like OS, an nc-OS, and a CAAC-OS are prepared. Each of the samples is an In—Ga—Zn oxide.

First, a high-resolution cross-sectional TEM image of each sample is obtained. The high-resolution cross-sectional TEM images show that all the samples have crystal parts.

Then, the size of the crystal part of each sample is measured. FIG. 12 shows the change in the average size of crystal parts (at 22 points to 45 points) in each sample. From FIG. 12, it is understood that the crystal part size in the a-like OS film increases with an increase of the total amount of electron irradiation. Specifically, as shown by (1) in FIG. 12, a crystal part of approximately 1.2 nm (also referred to as an initial nucleus) at the start of TEM observation grows to a size of approximately 2.6 nm at a cumulative electron dose of $4.2 \times 10^8$ e$^-$/nm$^2$. In contrast, the crystal part size in the nc-OS and the CAAC-OS shows little change from the start of electron irradiation to a cumulative electron dose of $4.2 \times 10^8$ e$^-$/nm$^2$ regardless of the cumulative electron dose. Specifically, as shown by (2) in FIG. 12, the average crystal size is approximately 1.4 nm regardless of the observation time by TEM. Furthermore, as shown by (3) in FIG. 12, the average crystal size is approximately 2.1 nm regardless of the observation time by TEM.

In this manner, growth of the crystal part occurs due to the crystallization of the a-like OS, which is induced by a slight amount of electron beam employed in the TEM observation. In contrast, in the nc-OS and the CAAC-OS that have good quality, crystallization hardly occurs by a slight amount of electron beam used for TEM observation.

Note that the crystal part size in the a-like OS and the nc-OS can be measured using high-resolution TEM images. For example, an InGaZnO$_4$ crystal has a layered structure in which two Ga—Zn—O layers are included between In—O layers. A unit cell of the InGaZnO$_4$ crystal has a structure in which nine layers of three In—O layers and six Ga—Zn—O layers are layered in the c-axis direction. Accordingly, the spacing between these adjacent layers is equivalent to the lattice spacing on the (009) plane (also referred to as d value). The value is calculated to 0.29 nm from crystal structure analysis. Thus, each of the lattice fringes having a distance therebetween of from 0.28 nm to 0.30 nm is regarded as corresponding to the a-b plane of the InGaZnO$_4$ crystal, focusing on the lattice fringes in the high-resolution TEM image.

Furthermore, the density of an oxide semiconductor varies depending on the structure in some cases. For example, when the composition of an oxide semiconductor is determined, the structure of the oxide semiconductor can be expected by comparing the density of the oxide semiconductor with the density of a single crystal oxide semiconductor having the same composition as the oxide semiconductor. For example, the density of the a-like OS is higher than or equal to 78.6% and lower than 92.3% of the density of the single crystal oxide semiconductor having the same composition. For example, the density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

Specific examples of the above description are given. For example, in the case of an oxide semiconductor having an atomic ratio of In:Ga:Zn=1:1:1, the density of single crystal InGaZnO$_4$ with a rhombohedral crystal structure is 6.357 g/cm$^3$. Accordingly, in the case of the oxide semiconductor having an atomic ratio of In:Ga:Zn=1:1:1, the density of the a-like OS is higher than or equal to 5.0 g/cm$^3$ and lower than 5.9 g/cm$^3$. For example, in the case of the oxide semiconductor having an atomic ratio of In:Ga:Zn=1:1:1, the density of each of the nc-OS and the CAAC-OS is higher than or equal to 5.9 g/cm$^3$ and lower than 6.3 g/cm$^3$.

Note that single crystals with the same composition do not exist in some cases. In such a case, by combining single crystals with different compositions at a given proportion, it is possible to calculate density that corresponds to the density of a single crystal with a desired composition. The density of the single crystal with a desired composition may be calculated using weighted average with respect to the combination ratio of the single crystals with different compositions. Note that it is preferable to combine as few kinds of single crystals as possible for density calculation.

Note that an oxide semiconductor may be a stacked film including two or more films of an amorphous oxide semiconductor, an a-like OS, a microcrystalline oxide semiconductor, and a CAAC-OS, for example.

An oxide semiconductor having a low impurity concentration and a low density of defect states (a small number of oxygen vacancies) can have low carrier density. Therefore, such an oxide semiconductor is referred to as a highly purified intrinsic or substantially highly purified intrinsic oxide semiconductor. A CAAC-OS and an nc-OS have a low impurity concentration and a low density of defect states as compared to an a-like OS and an amorphous oxide semiconductor. That is, a CAAC-OS and an nc-OS are likely to be highly purified intrinsic or substantially highly purified intrinsic oxide semiconductors. Thus, a transistor including a CAAC-OS or an nc-OS rarely has negative threshold voltage (is rarely normally on). The highly purified intrinsic or substantially highly purified intrinsic oxide semiconductor has few carrier traps.

Therefore, a transistor including a CAAC-OS or an nc-OS has small variation in electrical characteristics and high reliability. An electric charge trapped by the carrier traps in the oxide semiconductor takes a long time to be released. The trapped electric charge may behave like a fixed electric charge. Thus, the transistor which includes the oxide semiconductor having a high impurity concentration and a high density of defect states might have unstable electrical characteristics.

<Deposition Model>

Examples of deposition models of a CAAC-OS and an nc-OS are described below.

FIG. 13A is a schematic view of the inside of a deposition chamber where a CAAC-OS is deposited by a sputtering method.

A target 5130 is attached to a backing plate. A plurality of magnets are provided to face the target 5130 with the backing plate positioned therebetween. The plurality of magnets generate a magnetic field. A sputtering method in which the disposition speed is increased by utilizing a magnetic field of magnets is referred to as a magnetron sputtering method.

The target 5130 has a polycrystalline structure in which a cleavage plane exists in at least one crystal grain.

A cleavage plane of the target 5130 including an In—Ga—Zn oxide is described as an example. FIG. 14A shows a structure of an InGaZnO$_4$ crystal included in the target 5130. Note that FIG. 14A shows a structure of the case where the InGaZnO$_4$ crystal is observed from a direction parallel to the b-axis when the c-axis is in an upward direction.

FIG. 14A indicates that oxygen atoms in a Ga—Zn—O layer are positioned close to those in an adjacent Ga—Zn—O layer. The oxygen atoms have negative electric charge, whereby the two Ga—Zn—O layers repel each other. As a result, the InGaZnO$_4$ crystal has a cleavage plane between the two adjacent Ga—Zn—O layers.

A substrate 5120 is placed to face the target 5130, and the distance d (also referred to as a target-substrate distance (T-S distance)) is greater than or equal to 0.01 m and less than or equal to 1 m, preferably greater than or equal to 0.02 m and less than or equal to 0.5 m. The deposition chamber is mostly filled with a deposition gas (e.g., an oxygen gas, an argon gas, or a mixed gas containing oxygen at 5 vol % or higher) and the pressure in the deposition chamber is controlled to be higher than or equal to 0.01 Pa and lower than or equal to 100 Pa, preferably higher than or equal to 0.1 Pa and lower than or equal to 10 Pa. Here, discharge starts by application of a voltage at a constant value or higher to the target 5130, and plasma is observed. The magnetic field forms a high-density plasma region in the vicinity of the target 5130. In the high-density plasma region, the deposition gas is ionized, so that an ion 5101 is generated. Examples of the ion 5101 include an oxygen cation ($O^+$) and an argon cation ($Ar^+$).

The ion 5101 is accelerated toward the target 5130 side by an electric field, and collides with the target 5130 eventually. At this time, a pellet 5100a and a pellet 5100b which are flat-plate-like (pellet-like) sputtered particles are separated and sputtered from the cleavage plane. Note that structures of the pellet 5100a and the pellet 5100b may be distorted by an impact of collision of the ion 5101.

The pellet 5100a is a flat-plate-like (pellet-like) sputtered particle having a triangle plane, e.g., regular triangle plane. The pellet 5100b is a flat-plate-like (pellet-like) sputtered particle having a hexagon plane, e.g., regular hexagon plane. Note that flat-plate-like (pellet-like) sputtered particles such as the pellet 5100a and the pellet 5100b are collectively called pellets 5100. The shape of a flat plane of the pellet 5100 is not limited to a triangle or a hexagon. For example, the flat plane may have a shape formed by combining two or more triangles. For example, a quadrangle (e.g., rhombus) may be formed by combining two triangles (e.g., regular triangles).

The thickness of the pellet 5100 is determined depending on the kind of deposition gas and the like. The thicknesses of the pellets 5100 are preferably uniform; the reasons thereof are described later. In addition, the sputtered particle preferably has a pellet shape with a small thickness as compared to a dice shape with a large thickness. For example, the thickness of the pellet 5100 is greater than or equal to 0.4 nm and less than or equal to 1 nm, preferably greater than or equal to 0.6 nm and less than or equal to 0.8 nm. In addition, for example, the width of the pellet 5100 is greater than or equal to 1 nm and less than or equal to 3 nm, preferably greater than or equal to 1.2 nm and less than or equal to 2.5 nm. The pellet 5100 corresponds to the initial nucleus in the description of (1) in FIG. 12. For example, in the case where the ion 5101 collides with the target 5130 including an In—Ga—Zn oxide, the pellet 5100 that includes three layers of a Ga—Zn—O layer, an In—O layer, and a Ga—Zn—O layer as shown in FIG. 14B is ejected. Note that FIG. 14C shows the structure of the pellet 5100 observed from a direction parallel to the c-axis. Therefore, the pellet 5100 has a nanometer-sized sandwich structure including two Ga—Zn—O layers (pieces of bread) and an In—O layer (filling).

The pellet 5100 receives a charge when passing through the plasma, so that side surfaces thereof are negatively or positively charged in some cases. The pellet 5100 includes an oxygen atom on its side surface, and the oxygen atom may be negatively charged. As in this view, when the side surfaces are charged in the same polarity, charges repel each other, and accordingly, the pellet 5100 can maintain a flat-plate shape. In the case where a CAAC-OS is an In—Ga—Zn oxide, there is a possibility that an oxygen atom bonded to an indium atom is negatively charged. There is another possibility that an oxygen atom bonded to an indium atom, a gallium atom, or a zinc atom is negatively charged. In addition, the pellet 5100 may grow by being bonded with an indium atom, a gallium atom, a zinc atom, an oxygen atom or the like when passing through plasma. A difference in size between (2) and (1) in FIG. 12 corresponds to the amount of growth in plasma. Here, in the case where the temperature of the substrate 5120 is at around room temperature, the pellet 5100 does not grow anymore; thus, an nc-OS is formed (see FIG. 13B). An nc-OS can be deposited when the substrate 5120 has a large size because a temperature at which the deposition of an nc-OS is carried out is approximately room temperature. Note that in order that the pellet 5100 grows in plasma, it is effective to increase deposition power in sputtering. High deposition power can stabilize the structure of the pellet 5100.

As shown in FIGS. 13A and 13B, the pellet 5100 flies like a kite in plasma and flutters up to the substrate 5120. Since the pellets 5100 are charged, when the pellet 5100 gets close to a region where another pellet 5100 has already been deposited, repulsion is generated. Here, above the substrate 5120, a magnetic field in a direction parallel to the top surface of the substrate 5120 (also referred to as a horizontal magnetic field) is generated. A potential difference is given between the substrate 5120 and the target 5130, and accordingly, current flows from the substrate 5120 toward the target 5130. Thus, the pellet 5100 is given a force (Lorentz force) on the top surface of the substrate 5120 by an effect of the magnetic field and the current. This is explainable with Fleming's left-hand rule.

The mass of the pellet 5100 is larger than that of an atom. Therefore, to move the pellet 5100 over the top surface of the substrate 5120, it is important to apply some force to the pellet 5100 from the outside. One kind of the force may be force which is generated by the action of a magnetic field and current. In order to increase a force applied to the pellet 5100, it is preferable to provide, on the top surface, a region where the magnetic field in a direction parallel to the top surface of the substrate 5120 is 10 G or higher, preferably 20 G or higher, further preferably 30 G or higher, still further preferably 50 G or higher. Alternatively, it is preferable to provide, on the top surface, a region where the magnetic field in a direction parallel to the top surface of the substrate 5120 is 1.5 times or higher, preferably twice or higher, further preferably 3 times or higher, still further preferably 5 times or higher as high as the magnetic field in a direction perpendicular to the top surface of the substrate 5120.

At this time, the magnets and the substrate 5120 are moved or rotated relatively, whereby the direction of the horizontal magnetic field on the top surface of the substrate 5120 continues to change. Therefore, the pellet 5100 can be moved in various directions on the top surface of the substrate 5120 by receiving forces in various directions.

Furthermore, as shown in FIG. 13A, when the substrate 5120 is heated, resistance between the pellet 5100 and the substrate 5120 due to friction or the like is low. As a result, the pellet 5100 glides above the top surface of the substrate 5120. The glide of the pellet 5100 is caused in a state where the flat plane faces the substrate 5120. Then, when the pellet 5100 reaches the side surface of another pellet 5100 that has been already deposited, the side surfaces of the pellets 5100 are bonded. At this time, the oxygen atom on the side surface of the pellet 5100 is released. With the released oxygen atom, oxygen vacancies in a CAAC-OS is filled in some cases; thus, the CAAC-OS has a low density of defect states. Note that the temperature of the top surface of the substrate 5120 is, for example, higher than or equal to 100° C. and lower than 500° C., higher than or equal to 150° C. and lower than 450° C., or higher than or equal to 170° C. and lower than 400° C. Hence, even when the substrate 5120 has a large size, it is possible to deposit a CAAC-OS.

Further, the pellet 5100 is heated on the substrate 5120, whereby atoms are rearranged, and the structure distortion caused by the collision of the ion 5101 can be reduced. The pellet 5100 whose structure distortion is reduced is substantially single crystal. Even when the pellets 5100 are heated after being bonded, expansion and contraction of the pellet 5100 itself hardly occurs, which is caused by turning the pellet 5100 to be substantially single crystal. Thus, formation of defects such as a grain boundary due to expansion of a space between the pellets 5100 can be prevented, and accordingly, generation of crevasses can be prevented.

The CAAC-OS does not have a structure like a board of a single crystal oxide semiconductor but has arrangement with a group of pellets 5100 (nanocrystals) like stacked bricks or blocks. Furthermore, a grain boundary does not exist therebetween. Therefore, even when deformation such as shrink occurs in the CAAC-OS owing to heating during deposition, heating or bending after deposition, it is possible to relieve local stress or release distortion. Therefore, this structure is suitable for a flexible semiconductor device. Note that the nc-OS has arrangement in which pellets 5100 (nanocrystals) are randomly stacked.

When the target is sputtered with an ion, in addition to the pellets, zinc oxide or the like may be ejected. The zinc oxide is lighter than the pellet and thus reaches the top surface of the substrate 5120 before the pellet. As a result, the zinc oxide forms a zinc oxide layer 5102 with a thickness greater than or equal to 0.1 nm and less than or equal to 10 nm, greater than or equal to 0.2 nm and less than or equal to 5 nm, or greater than or equal to 0.5 nm and less than or equal to 2 nm. FIGS. 15A to 15D are cross-sectional schematic views.

Figure 15A:
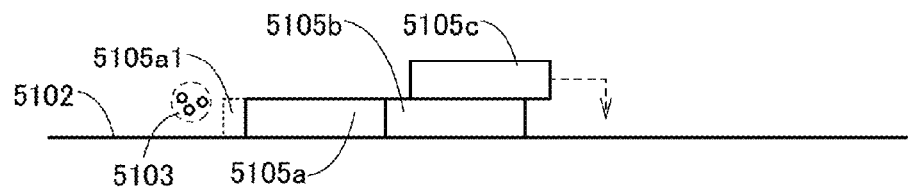
FIGS. 15A to 15D are schematic views showing a deposition model of a CAAC-OS film.

As illustrated in FIG. 15A, a pellet 5105a and a pellet 5105b are deposited over the zinc oxide layer 5102. Here, side surfaces of the pellet 5105a and the pellet 5105b are in contact with each other. In addition, a pellet 5105c is deposited over the pellet 5105b, and then glides over the pellet 5105b. Furthermore, a plurality of particles 5103 ejected from the target together with the zinc oxide are crystallized by heating of the substrate 5120 to form a region 5105a1 on another side surface of the pellet 5105a. Note that the plurality of particles 5103 may contain oxygen, zinc, indium, gallium, or the like.

Figure 15B:
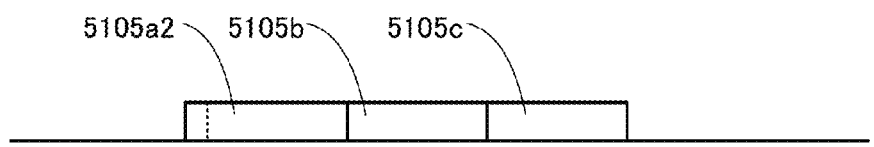

Then, as illustrated in FIG. 15B, the region 5105a1 grows to part of the pellet 5105a to form a pellet 5105a2. In addition, a side surface of the pellet 5105c is in contact with another side surface of the pellet 5105b.

Figure 15C:
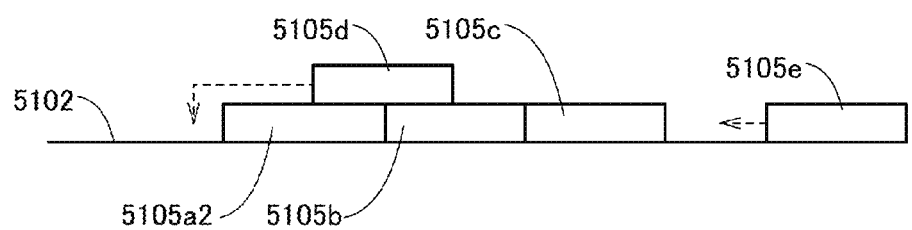

Next, as illustrated in FIG. 15C, a pellet 5105d is deposited over the pellet 5105a2 and the pellet 5105b, and then glides over the pellet 5105a2 and the pellet 5105b. Furthermore, a pellet 5105e glides toward another side surface of the pellet 5105c over the zinc oxide layer 5102.

Figure 15D:
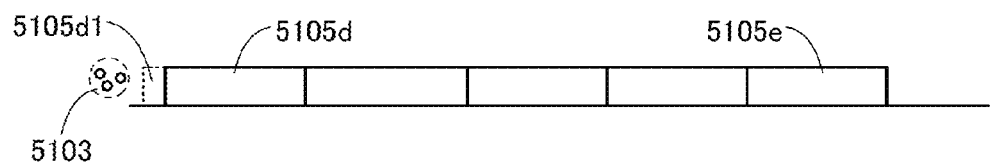

Then, as illustrated in FIG. 15D, the pellet 5105d is placed so that a side surface of the pellet 5105d is in contact with a side surface of the pellet 5105a2. Furthermore, a side surface of the pellet 5105e is in contact with another side surface of the pellet 5105c. A plurality of particles 5103 ejected from the target together with the zinc oxide are crystallized by heating of the substrate 5120 to form a region 5105d1 on another side surface of the pellet 5105d.

As described above, deposited pellets are placed to be in contact with each other and then growth is caused at side surfaces of the pellets, whereby a CAAC-OS is formed over the substrate 5120. Therefore, each pellet of the CAAC-OS is larger than that of the nc-OS. A difference in size between (3) and (2) in FIG. 12 corresponds to the amount of growth after deposition.

When spaces between pellets 5100 are extremely small, the pellets may form a large pellet. The large pellet has a single crystal structure. For example, the size of the large pellet may be greater than or equal to 10 nm and less than or equal to 200 nm, greater than or equal to 15 nm and less than or equal to 100 nm, or greater than or equal to 20 nm and less than or equal to 50 nm, when seen from the above. Therefore, when a channel formation region of a transistor is smaller than the large pellet, the region having a single crystal structure can be used as the channel formation region. Furthermore, when the size of the pellet is increased, the region having a single crystal structure can be used as the channel formation region, the source region, and the drain region of the transistor.

In this manner, when the channel formation region or the like of the transistor is formed in a region having a single crystal structure, the frequency characteristics of the transistor can be increased in some cases.

It is considered that as shown in such a model, the pellets 5100 are deposited on the substrate 5120. Thus, a CAAC-OS film can be deposited even when a surface over which a film is formed (film formation surface) does not have a crystal structure, which is different from film deposition by epitaxial growth. For example, even when the top surface (formation surface) of the substrate 5120 has an amorphous structure (e.g., the top surface is formed of amorphous silicon oxide), a CAAC-OS can be formed.

In addition, it is found that in formation of the CAAC-OS, the pellets 5100 are arranged in accordance with the top surface shape of the substrate 5120 that is the formation surface even when the formation surface has unevenness. For example, in the case where the top surface of the substrate 5120 is flat at the atomic level, the pellets 5100 are arranged so that flat planes parallel to the a-b plane face downwards. In the case where the thicknesses of the pellets 5100 are uniform, a layer with a uniform thickness, flatness, and high crystallinity is formed. By stacking n layers (n is a natural number), the CAAC-OS can be obtained.

In the case where the top surface of the substrate 5120 has unevenness, a CAAC-OS in which n layers (n is a natural number) in each of which the pellets 5100 are arranged along the unevenness are stacked is formed. Since the substrate 5120 has unevenness, a gap is easily generated between in the pellets 5100 in the CAAC-OS in some cases. Note that owing to intermolecular force, the pellets 5100 are arranged so that a gap between the pellets is as small as possible even on the unevenness surface. Therefore, even when the formation surface has unevenness, a CAAC-OS with high crystallinity can be obtained.

As a result, laser crystallization is not needed for formation of a CAAC-OS, and a uniform film can be formed even over a large-sized glass substrate.

Since the CAAC-OS film is deposited in accordance with such a model, the sputtered particle preferably has a pellet shape with a small thickness. Note that when the sputtered particles has a dice shape with a large thickness, planes facing the substrate 5120 vary, which may lead to formation of a film whose thickness or crystal alignment is not uniformed.

According to the deposition model described above, a CAAC-OS with high crystallinity can be formed even on a film formation surface with an amorphous structure.

This embodiment can be combined with any of the other embodiments in this specification as appropriate.

Embodiment 4

In this embodiment, a program structure of one embodiment of the present invention is described with reference to FIG. 4.

Figure 4:
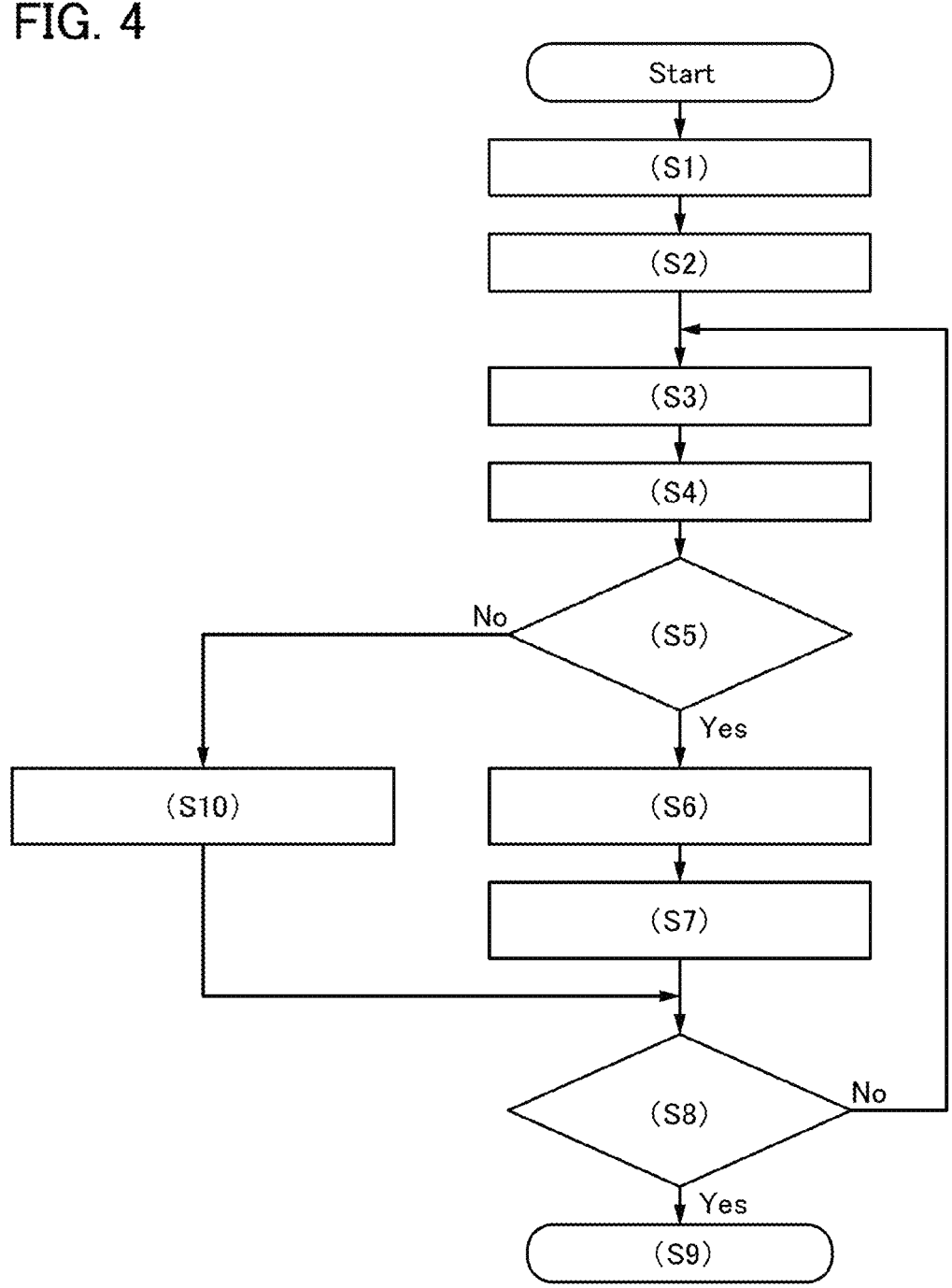
FIG. 4 is a flow chart showing a program of one embodiment.

FIG. 4 is a flow chart showing a structure of a program of one embodiment of the present invention.

<Structure Example of Program>

The program described in this embodiment includes the following ten steps.

<<First Step>>

In the first step, the arithmetic device 10 is initialized. For example, parameter values that can reconstruct the initial state of the program are obtained and stored in the memory portion 12 (see S1 in FIG. 4).

<<Second Step>>

In the second step, interrupt processing is allowed (see S2 in FIG. 4).

Note that when the interrupt processing is allowed, the arithmetic portion 11 can receive an instruction to execute the interrupt processing. Having received the instruction to execute the interrupt processing, the arithmetic portion 11 stops the main processing and executes the interrupt processing. For example, the arithmetic portion 11 that has received an event associated with the instruction executes the interrupt processing, and stores the execution result in the memory portion 12. Then, the arithmetic portion 11 that has returned from the interrupt processing can resume the main processing based on the execution result of the interrupt processing.

Specifically, the arithmetic portion 11 can receive a termination instruction in the interrupt processing. Then, the arithmetic portion 11 that has returned from the interrupt processing to resume the main processing can terminate the program in accordance with the termination instruction supplied in the interrupt processing.

<<Third Step>>

In the third step, image data to be displayed on the display device 30 is generated (see S3 in FIG. 4).

<<Fourth Step>>

In the fourth step, sensing data on usage environment of the display device 30 is obtained (see S4 in FIG. 4).

<<Fifth Step>>

In the fifth step, the processing is determined to proceed to a sixth step when the sensing data includes data of illuminance less than predetermined illuminance, while determined to proceed to a tenth step when the sensing data includes data of illuminance more than or equal to the predetermined illuminance (see S5 in FIG. 4).

<<Sixth Step>>

In the sixth step, the transmittance of the second display region 201 is made high (see S6 in FIG. 4).

<<Seventh Step>>

In the seventh step, the image data is displayed on the first display region 101 (see S7 in FIG. 4).

<<Eighth Step>>

In the eighth step, the processing is determined to proceed to a ninth step when a termination instruction has been supplied in the interrupt processing, while determined to return to the third step when the termination instruction has not been supplied in the interrupt processing (see S8 in FIG. 4).

<<Ninth Step>>

In the ninth step, the arithmetic processing terminates (see S9 in FIG. 4).

<<Tenth Step>>

In the tenth step, the image data is displayed on the second display region 201, and the processing proceeds to the eighth step (see S10 in FIG. 4).

The program that can be used in the data processing device 300 described in this embodiment includes a step of making the transmittance of the second display region 201 high and making the first display region 101 display the image data when the sensing data includes data of illuminance less than the predetermined illuminance, and a step of making the second display region display the image data when the sensing data includes data of illuminance more than or equal to the predetermined illuminance. Therefore, the image data can be displayed on the first display region or the second display region depending on illuminance under usage environment of the display device. Thus, the novel program can be highly convenient or reliable.

In a modification example of the program, the tenth step can be replaced with the following step.

<<Modification Example of Tenth Step>>

In the tenth step, when a predetermined instruction has been supplied in the interrupt processing, the image data is displayed not only on the second display region 201 but also on the first display region 101, and then the processing proceeds to the eighth step.

With such a step, a user can select a display region that the user like by using a predetermined instruction.

This embodiment can be combined with any of the other embodiments in this specification as appropriate.

Embodiment 5

In this embodiment, a structure of a display panel of one embodiment of the present invention will be described with reference to FIGS. 5A and 5B.

Figure 5A:
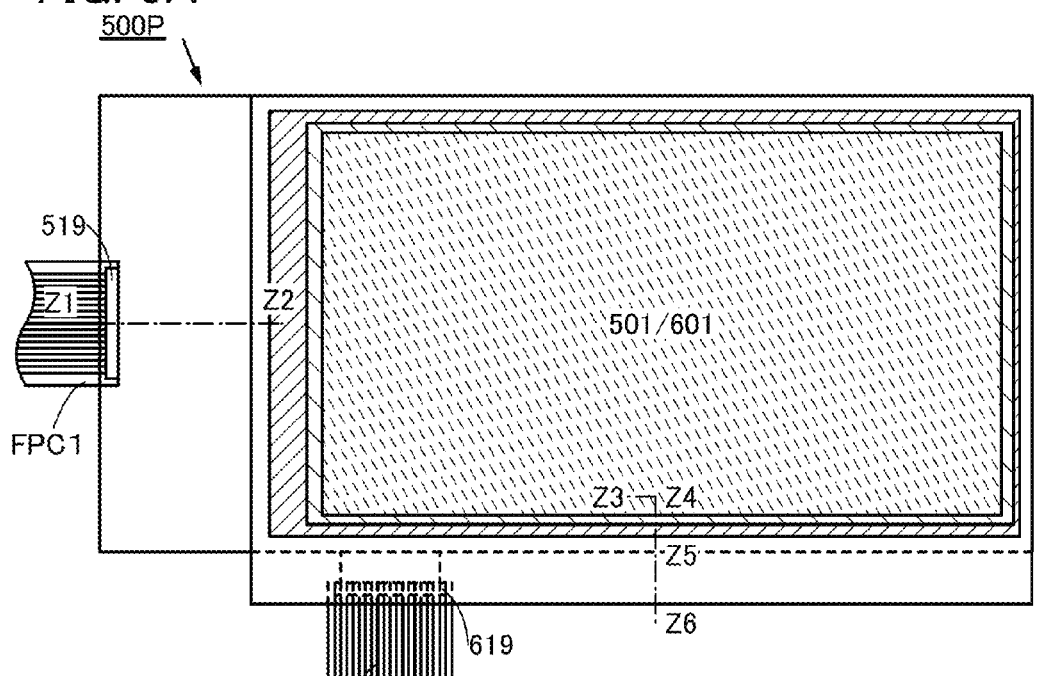
FIGS. 5A and 5B illustrate a structure of a display panel of one embodiment.
Figure 5B:
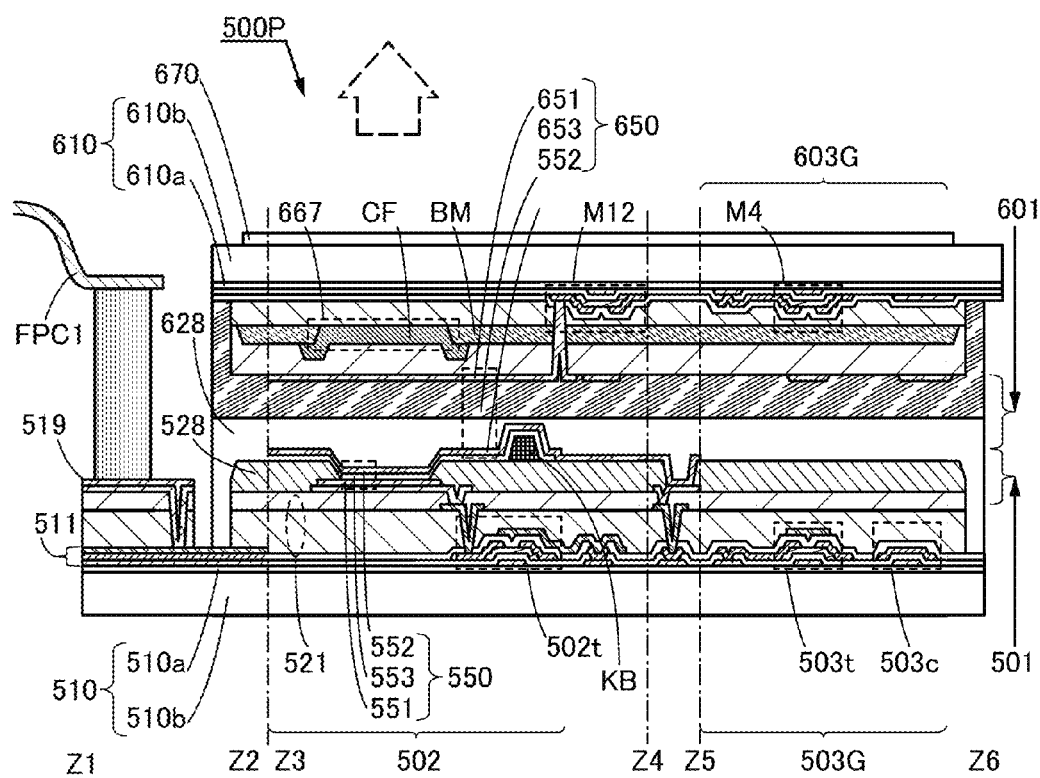

FIGS. 5A and 5B illustrate a structure of a display panel 500P of one embodiment of the present invention. FIG. 5A is a top view of the display panel 500P of one embodiment of the present invention, and FIG. 5B is a cross-sectional view taken along line Z1-Z2, and line Z3-Z4-Z5-Z6.

<Structure Example of Display Panel>

The display panel 500P described in this embodiment includes a first base 510, a second base 610 overlapping with the first base, a first display element 550, a second display element 650, an insulating layer 628, a first display region 501, and a second display region 601 (see FIGS. 5A and 5B).

The first display element 550 includes a first electrode 551, a common electrode 552 overlapping with the first electrode 551, and an EL layer 553 (a layer including a luminescent organic compound) between the first electrode 551 and the common electrode 552 (see FIG. 1B).

The second display element 650 includes a second electrode 651 overlapping with the common electrode 552, and an LC layer 653 (a layer including liquid crystal) between the common electrode 552 and the second electrode 651.

The insulating layer 628 is provided between the common electrode 552 and the LC layer 653.

The first display region 501 includes a plurality of first display elements 550.

The second display region 601 includes a plurality of second display elements 650 and overlaps with the first display region 501.

The first display element 550 has a function of emitting light. The second display element 650 has a function of controlling light transmittance.

The LC layer 653 includes a polymer and liquid crystal dispersed in the polymer.

The first display region 501 has a function of displaying an image toward the side where the second display region 601 is provided. The second display region 601 has a function of displaying an image by controlling transmittance of light entering from the opposite side to the side where the first display region 501 is provided.

In addition, a coloring layer CF is provided. The second electrode 651 is provided between the coloring layer CF and the LC layer 653.

The display panel 500P illustrated in this embodiment includes: the first base 510; the second base 610 overlapping with the first base 510; the first display element 550 capable of emitting light and including the first electrode 551, the common electrode 552 that overlaps with the first electrode 551, and the EL layer 553 between the first electrode 551 and the common electrode 552; the second display element 650 capable of controlling light transmittance and including the common electrode 552, the second electrode 651 that overlaps with the common electrode 552, and the LC layer 653 between the second electrode 651 and the common electrode 552; the insulating layer 628 between the common electrode 552 and the LC layer 653; the first display region 501 including a plurality of the first display elements 550; and the second display region 601 including a plurality of the second display elements 650 and overlapping with the first display region 501.

With such a structure, an image can be displayed with the use of light from outside and the second display element and without the use of the first display region, or can be displayed with the use of the second display region in a condition to transmit light and the first display element. Thus, the novel display panel can be highly convenient or reliable. In addition, the novel display panel would consume less power when used under external light.

Furthermore, the display panel 500P includes the pixel circuit for driving the first display element 550, and a wiring 511 electrically connected to the pixel circuit. The display panel 500P further includes the pixel circuit for driving the second display element 650, and a wiring electrically connected the pixel circuit.

The display panel 500P includes an insulating layer 521 covering a transistor 502*t* included in the pixel circuit.

In addition, the display panel 500P includes a terminal portion 519 and a terminal portion 619. The terminal portion 519 includes a terminal electrically connected to the wiring 511, and the terminal portion 619 includes a terminal electrically connected to the wiring. The terminal portion 519 is electrically connected to a flexible printed circuit board (FPC) 1, and the terminal portion 619 is electrically connected an FPC 2.

The display panel 500P further includes a pixel 502.

The pixel 502 includes at least a pair of the first display element 550 and the pixel circuit and a pair of the second display element 650 and the pixel circuit. The pixel 502 may include the pair of the first display element 550 and the pixel circuit and the plural pairs of the second display elements 650 and the pixel circuits. Alternatively, the pixel 502 may include the plural pairs of the first display elements 550 and the pixel circuits and the pair of the second display element 650 and the pixel circuit.

The display panel 500P includes a light-blocking layer BM with an opening 667. The opening 667 overlaps with the second electrode 651.

The display panel 500P includes a partition 528 with an opening. The opening overlaps with the first electrode 551. The partition 528 has an insulation property, and covers an end portion of the first electrode 551.

The display panel 500P further includes a spacer KB. The spacer KB is large enough to provide a certain distance between the common electrode 552 and the second electrode 651.

Specifically, the spacer KB is large enough to provide a distance of larger than or equal to 3 µm and less than or equal to 10 µm, or preferably larger than or equal to 3.5 µm and less than or equal to 6 µm, between the common electrode 552 and the second electrode 651. When the distance is less than 3 µm, it is difficult to display an image with excellent contrast between light and dark with the use of the second display region 601. When the distance is more than 10 µm, it is difficult to display an image with a wide view angle with the use of the first display region 501. In addition, power consumed by the second display element 650 increases.

The display panel 500P includes the first base 510 and the second base 610. The first base 510 and the second base 610 sandwich the first display region 501 and the second display region 601.

The first base 510 includes an insulating layer 510*a* and a support 510*b*. Note that a composite material where the insulating layer 510*a*, the flexible support that overlaps with the insulating layer 510*a*, and a resin layer that has a function of attaching the insulating layer 510*a* to the flexible support are stacked can be used for the first base 510.

The second base 610 includes an insulating layer 610*a* and a support 610*b*. Note that a composite material where the insulating layer 610*a*, the flexible support that overlaps with the insulating layer 610*a*, and a resin layer that has a function of attaching the insulating layer 610*a* and the flexible support are stacked can be used for the second base 610.

The display panel 500P includes a protective layer 670 in a region overlapping with the first display region 501 or the second display region 601.

Furthermore, the display panel 500P includes a driver circuit 503G or a driver circuit 603G. The driver circuit 503G drives the pixels arranged in the first display region 501, and the driver circuit 603G drives the pixels arranged in the second display region 601.

Individual components included in the display panel 500P will be described below. Note that these units can not be clearly distinguished and one unit also serves as another unit or include part of another unit in some cases.

For example, the common electrode 552 between the EL layer 553 and the LC layer 653 is a component that constitutes the first display element 550 and is also a component that constitutes the second display element 650.

<<Pixel 502>>

Electronic elements such as the transistor 502*t* can be used in the pixel circuit for driving the first display element 550.

Note that an active element such as a transistor is not necessarily used. For example, the pixel may be a passive matrix type instead of an active matrix type.

<<Pixel 602>>

Electronic elements such as a transistor M12 can be used in the pixel circuit for driving the second display element 650.

Note that an active element such as a transistor is not necessarily used. For example, the pixel may be a passive matrix type instead of an active matrix type.

<<Insulating Layer 521>>

Note that the insulating layer 521 can be used as a layer for planarizing unevenness caused by the pixel circuits. A stacked film including a layer that can prevent diffusion of impurities can be used as the insulating layer 521. This can suppress a decrease in the reliability of the transistor 502$t$ or the like due to diffusion of impurities.

<<Partition 528>>

The partition 528 has an insulation property. For example, an insulating organic or inorganic material can be used for the partition 528.

For example, a material or a composite material of a plurality of materials can be used for the partition 528. Specifically, it is possible to use a composite material in which a plurality of materials are stacked or a composite material in which a fibrous or particulate material is dispersed in another material.

For example, an organic material such as a resin can be used for the partition 528. Specifically, a thin film containing polyester, polyolefin, polyamide, polyimide, polycarbonate, an acrylic resin, or a material containing a photosensitive polymer can be used.

For example, an inorganic oxide, an inorganic nitride, or an inorganic oxynitride can be used for the partition 528. Specifically, a thin film containing silicon oxide, silicon nitride, silicon oxynitride, alumina, or the like can be used.

Specifically, a 0.8-μm-thick polyimide can be used for the partition 528.

<<Driver Circuit>>

The driver circuit 503G supplies, for example, a selection signal to the pixel circuit for driving the first display element 550. A transistor 503$t$, a capacitor 503$c$, or the like can be used for the driver circuit 503G, for example.

The driver circuit 603G supplies, for example, a selection signal to the pixel circuit for driving the second display element 650. A transistor M4 or the like can be used for the driver circuit 603G, for example.

<<Wiring and Terminal Portions>>

The wiring 511, the terminal portion 519, and the terminal portion 619 include a conductive material.

For example, an inorganic conductive material, an organic conductive material, a metal material, a conductive ceramic material, or the like can be used.

Specifically, a metal element selected from aluminum, gold, platinum, silver, chromium, tantalum, titanium, molybdenum, tungsten, nickel, iron, cobalt, palladium, and manganese; an alloy including any of the above-described metal elements; an alloy including any of the above-described metal elements in combination; or the like can be used.

Alternatively, a conductive oxide such as indium oxide, indium tin oxide, indium zinc oxide, zinc oxide, or zinc oxide to which gallium is added can be used.

Alternatively, graphene or graphite can be used. The film including graphene can be formed, for example, by reducing a film containing graphene oxide. As a reducing method, a method using heat, a method using a reducing agent, or the like can be employed.

Alternatively, a conductive polymer can be used.

<<Base>>

For example, a stack where the insulating layer 510$a$ preventing diffusion of impurities and the support 510$b$ are stacked can be favorably used for the base 510.

For example, a stack where the insulating layer 610$a$ preventing diffusion of impurities and the support 610$b$ are stacked can be used for the base 610.

Specifically, glass with a thickness of larger than or equal to 20 μm and less than or equal to 200 μm, preferably larger than or equal to 25 μm and less than or equal to 100 μm, can be used for the insulating layer 510$a$ and/or the insulating layer 610$a$. The glass with such a thickness can have both high flexibility and a high barrier property against water and oxygen.

A resin with a thickness of larger than or equal to 10 μm and less than or equal to 200 μm, preferably larger than or equal to 20 μm and less than or equal to 50 μm, can be used for the support 510$b$ and/or the support 610$b$. With the use of a stack where such a resin layer is provided outside the glass, an occurrence of a crack or a break in the glass can be suppressed and mechanical strength can be improved. Alternatively, with a substrate that includes a composite material of such a glass material and an organic resin, a highly reliable and flexible light-emitting panel can be provided.

Alternatively, a composite material in which an inorganic material with a thickness of 10 μm or less and a resin film with a thickness of more than 10 μm are attached to each other can be used, for example. With such a material, the display panel can be bent with a curvature radius of 5 mm or less, preferably 4 mm or less, more preferably 3 mm or less, particularly preferably 1 mm or less.

<<Protective Layer 670>>

For example, an antireflective layer, specifically, a circular polarizing plate can be used for the protective layer 670.

For example, a ceramic coat layer or a hard coat layer can be used for the protective layer 670. Specifically, a layer containing aluminum oxide, or a UV or electron beam curable resin can be used. This can prevent the display region 501 and the display region 601 in an input/output device 500TP from being damaged.

<<Spacer>>

The spacer KB is large enough to provide a predetermined distance between the common electrode 552 and the second electrode 651. Note that there is a region where the spacer KB, the light-blocking layer BM, and the partition 528 overlap with one another.

The insulating layer 628 is provided between the common electrode 552 and the second electrode 651, and has an insulation property. Specifically, the insulating layer 628 is provided between the common electrode 552 and the LC layer 653. The insulating layer 628 can prevent occurrence of short circuit between the common electrode 552 and the second electrode 651.

For example, an adhesive agent that attaches a process member where the first display region 501 is formed to a process member where the second electrode and the LC layer 653 are formed can be used as the insulating layer 628. Specifically, an epoxy resin, an acrylic resin, or the like can be used.

This embodiment can be combined with any of the other embodiments in this specification as appropriate.

Embodiment 6

In this embodiment, a structure of an input/output device including the display panel of one embodiment of the present invention will be described with reference to FIGS. 6A to 6C.

Figure 6A:
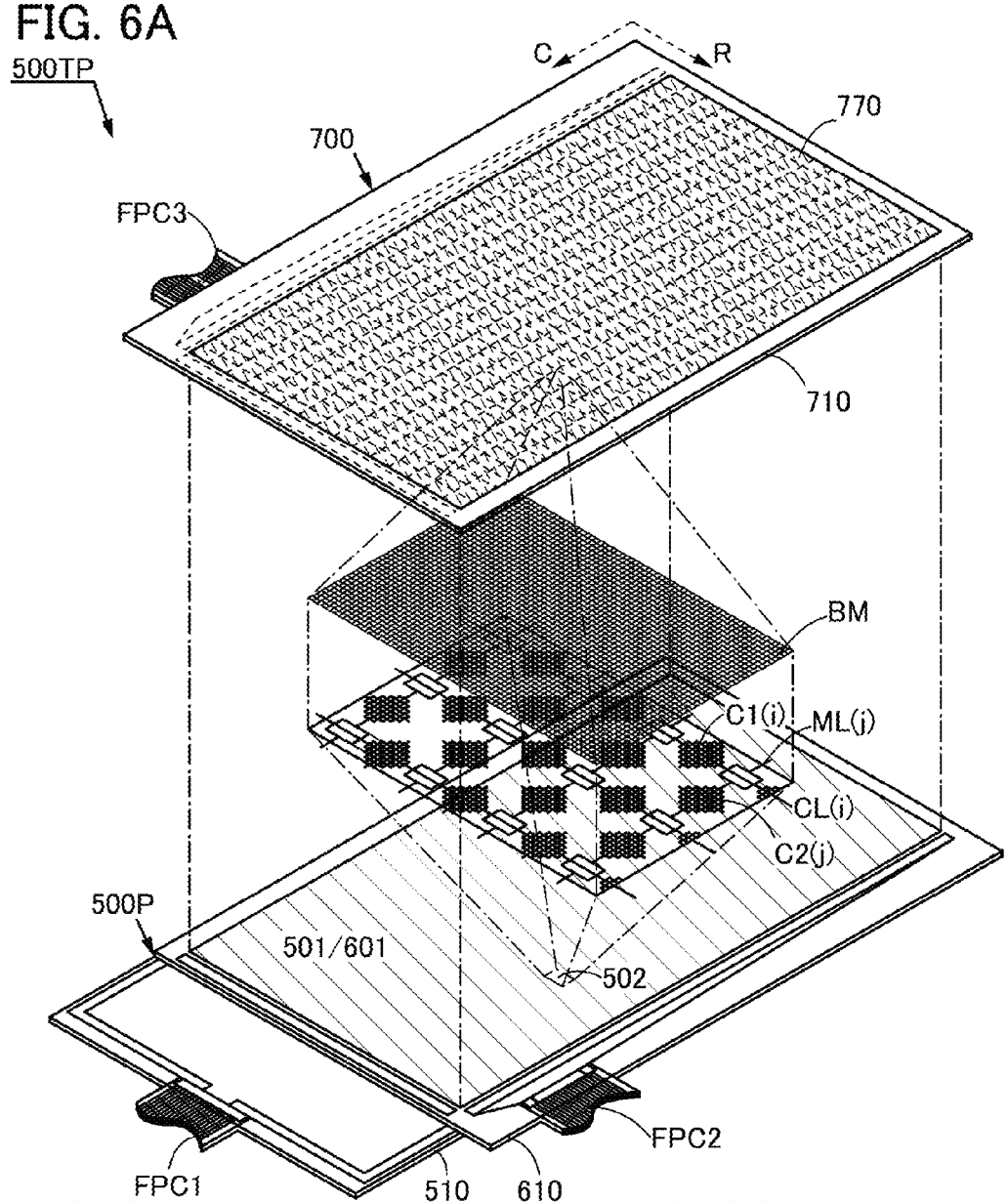
FIGS. 6A, 6B and 6C are each a projection view illustrating a structure of a data processing device of one embodiment.

FIG. 6A is a projection view illustrating the input/output device 500TP of one embodiment of the present invention. Note that for convenience of description, part of a sensor panel 700 is enlarged. FIG. 6B is a top view illustrating a structure of part of the sensor panel 700, and FIG. 6C is a cross-sectional view taken along line W3-W4 in FIG. 6B.

<Structure Example of Input/Output Device>

The input/output device 500TP described in this embodiment includes the display panel 500P and the sensor panel 700 overlapping with the display panel 500P (see FIG. 6A).

The sensor panel 700 has a function of receiving a control signal and supplying a sensing signal.

The sensor panel 700 includes a plurality of control lines CL(i) that is supplied with control signals and extends in the row direction (the direction indicated by an arrow R in the figure) and a plurality of signal lines ML(j) that supplies sensing signals and extends in the column direction (the direction indicated by an arrow C in the figure). The sensor panel 700 also includes a base 710 supporting the control lines CL(i) and the signal lines ML(j).

The sensor panel 700 includes a first electrode C1(i) electrically connected to the control line CL(i) and a second electrode C2(j) electrically connected to the signal line ML(j). The second electrode C2(j) includes a region not overlapping with the first electrode C1(i).

The base 710 supports the first electrode C1(i) and the second electrode C2(j).

The display panel 500P includes the pixel 502.

The first electrode C1(i) or the second electrode C2(j) includes a conductive film in which regions overlapping with the pixels 502 have light-transmitting properties. Alternatively, the first electrode C1(i) or the second electrode C2(j) includes a net-like conductive film whose openings 767 overlap with the pixels 502.

The input/output device 500TP of this embodiment includes the sensor panel 700 and the display panel 500P including the region overlapping with the sensor panel 700. The first electrode C1(i) or the second electrode C2(j) includes the conductive film having the regions with light-transmitting properties or the openings 767 in the regions overlapping with the pixels of the display panel 500P. The input/output device 500TP can thus sense an object getting close to the first electrode or the second electrode. A novel input/output device that is highly convenient or reliable can thus be provided.

For example, the sensor panel 700 of the input/output device 500TP can sense sensing data and supply the sensing data together with the positional data. Specifically, a user of the input/output device 500TP can make various gestures (e.g., tap, drag, swipe, and pinch in) using his/her finger or the like that approaches or is in contact with the sensor panel 700 as a pointer.

The sensor panel 700 is capable of sensing approach or contact of a finger or the like to the sensor panel 700 and supplying sensing data including the obtained position, track, or the like.

An arithmetic device determines whether or not supplied data satisfies a predetermined condition on the basis of a program or the like and executes an instruction associated with a predetermined gesture.

A user of the sensor panel 700 can thus make the predetermined gesture and make the arithmetic device execute instructions associated with the predetermined gesture.

The display panel 500P of the input/output device 500TP can display image data V supplied from, for example, the arithmetic device.

The sensor panel 700 of the input/output device 500TP is electrically connected to an FPC 3.

A protective layer 770 is provided on the user's side of the sensor panel 700.

For example, a ceramic coat layer or a hard coat layer can be used as the protective layer 770. Specifically, a layer containing aluminum oxide or a layer containing a UV curable resin can be used.

An anti-reflective layer that weaken the intensity of external light reflected by the sensor panel 700 can be used for the protective layer 770. Specifically, a circular polarizing plate or the like can be used.

Individual components included in the input/output device 500TP are described below. Note that these units can not be clearly distinguished and one unit also serves as another unit or include part of another unit in some cases.

For example, the input/output device 500TP where the sensor panel 700 overlaps with the display panel 500P serves as the sensor panel 700 and the display panel 500P. Note that the input/output device 500TP in which the sensor panel 700 overlaps with the display panel 500P is also referred to as a touch panel.

<<Overall Structure>>

The input/output device 500TP described in this embodiment includes the display panel 500P or the sensor panel 700 (see FIG. 6A).

<<Display Panel>>

The display panel 500P includes the pixel 502, the scan lines, the signal lines, and the base 510. For example, the display panel 500P described in Embodiment 4 can be used.

<<Sensor Panel>>

The sensor panel 700 senses an object which approaches or touches the sensor panel 700 and supplies a sensing signal. For example, the sensor panel 700 senses electrostatic capacitance, illuminance, magnetic force, a radio wave, pressure, or the like and supplies data based on the sensed physical value. Specifically, a capacitor, a photoelectric conversion element, a magnetic sensor element, a piezoelectric element, a resonator, or the like can be used as a sensor element.

For example, the sensor panel 700 senses a change in electrostatic capacitance between the sensor panel 700 and an object that approaches or is in contact with the sensor panel 700.

Note that when an object which has a higher dielectric constant than the air, such as a finger, approaches the conductive film in the air, electrostatic capacitance between the finger and the conductive film changes. The sensor panel 700 can sense the change in electrostatic capacitance and supply sensing data. Specifically, the conductive film and a capacitor one electrode of which is connected to the conductive film can be used.

For example, distribution of charge occurs between the conductive film and the capacitor owing to the change in the electrostatic capacitance, so that the voltage between the pair of electrodes of the capacitor is changed. This voltage change can be used as the sensing signal.

Figure 6B:
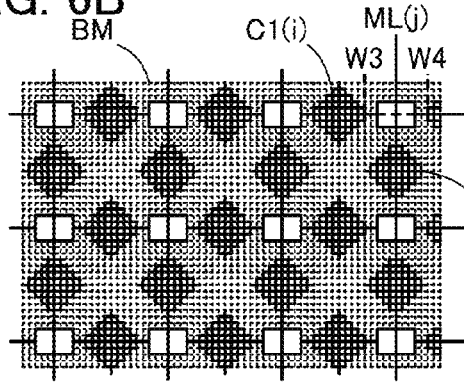
Figure 6C:
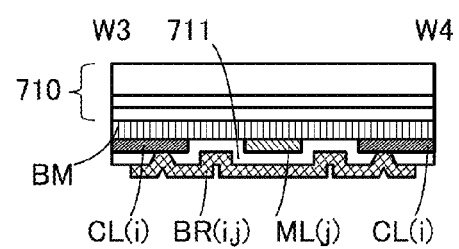

The sensor panel 700 includes the control line CL(i), the signal line ML(j), the first electrode C1(i), the second electrode C2(j), or the base 710 (see FIGS. 6A and 6B).

Note that a wiring BR(i,j) is in a position where the control line CL(i) intersects with the signal line ML(j). An insulating film 711 having a function of preventing short circuit is provided between the wiring BR(i,j) and the signal line ML(j) (see FIG. 6C).

The signal line ML(j) can sense a control signal which is supplied to the control line CL(i) through a capacitor including the first electrode C1(i) and the second electrode C2(j), and can supply the signal as a sensing signal.

The light-blocking layer BM is provided between the control line CL(i) and the base 710 and between the signal line ML(j) and the base 710, for example. This can weaken external light reaching the control line CL(i) or the signal line ML(j) and decrease the intensity of the external light reflected by the control line CL(i) or the signal line ML(j).

The sensor panel 700 may be formed by depositing films for forming the sensor panel 700 over the base 710 and processing the films.

Alternatively, the sensor panel 700 may be formed in such a manner that part of the sensor panel 700 is formed over another base, and the part is transferred to the base 610.

<<Wiring>>

The sensor panel 700 includes wirings. The wirings include the control line CL(i), the signal line ML(j), and the like.

A conductive material can be used for the wirings and the like.

For example, an inorganic conductive material, an organic conductive material, metal, conductive ceramics, or the like can be used for the wirings.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wirings and the like. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked-layer structure in which a film of an element selected from titanium, tantalum, tungsten, molybdenum, chromium, neodymium, and scandium, or an alloy film or nitride film in which a plurality of elements selected from titanium, tantalum, tungsten, molybdenum, chromium, neodymium, and scandium are combined is stacked over an aluminum film can be used.

Alternatively, a conductive oxide such as indium oxide, indium tin oxide, indium zinc oxide, zinc oxide, or zinc oxide to which gallium is added can be used.

Alternatively, graphene or graphite can be used. The film including graphene can be formed, for example, by reducing a film containing graphene oxide. As a reducing method, a method using heat, a method using a reducing agent, or the like can be employed.

Alternatively, a conductive polymer can be used.

<<Base>>

There is no particular limitation on the base 710 as long as the base 710 has heat resistance high enough to withstand a manufacturing process and a thickness and a size which can be used in a manufacturing apparatus. In particular, use of a flexible material as the base 710 enables the sensor panel 700 to be folded or unfolded. Note that in the case where the sensor panel 700 is positioned on a side where the display panel 500P displays an image, a light-transmitting material is used for the base 710.

For the base 710, an organic material, an inorganic material, a composite material of an organic material and an inorganic material, or the like can be used.

For example, an inorganic material such as glass, ceramic, or metal can be used for the base 710.

Specifically, non-alkali glass, soda-lime glass, potash glass, crystal glass, or the like can be used for the base 710.

Specifically, a metal oxide film, a metal nitride film, a metal oxynitride film, or the like can be used for the base 710. For example, silicon oxide, silicon nitride, silicon oxynitride, an alumina film, or the like can be used for the base 710.

For example, an organic material such as a resin, a resin film, or plastic can be used for the base 710.

Specifically, a resin film or resin plate of polyester, polyolefin, polyamide, polyimide, polycarbonate, an acrylic resin, or the like can be used for the base 710.

For example, a composite material such as a resin film to which a thin glass plate or a film of an inorganic material is attached can be used as the base 710.

For example, a composite material formed by dispersing a fibrous or particulate metal, glass, inorganic material, or the like into a resin film can be used as the base 710.

For example, a composite material formed by dispersing a fibrous or particulate resin, organic material, or the like into an inorganic material can be used as the base 710.

A single-layer material or a stacked-layer material in which a plurality of layers are stacked can be used for the base 710. For example, a stacked-layer material including a base and an insulating layer or the like that prevents diffusion of impurities contained in the base can be used for the base 710.

Specifically, a stacked-layer material in which glass and one or a plurality of films that prevent diffusion of impurities contained in the glass, such as a silicon oxide film, a silicon nitride film, and a silicon oxynitride film, are stacked can be used for the base 710.

Alternatively, a stacked-layer material in which a resin and a film that prevents diffusion of impurities contained in the resin, such as a silicon oxide film, a silicon nitride film, or a silicon oxynitride film, are stacked can be used for the base 710.

This embodiment can be combined with any of the other embodiments in this specification as appropriate.

Embodiment 7

In this embodiment, a structure of a data processing device of one embodiment of the present invention will be described with reference to FIGS. 17A to 17C.

Figure 17A:
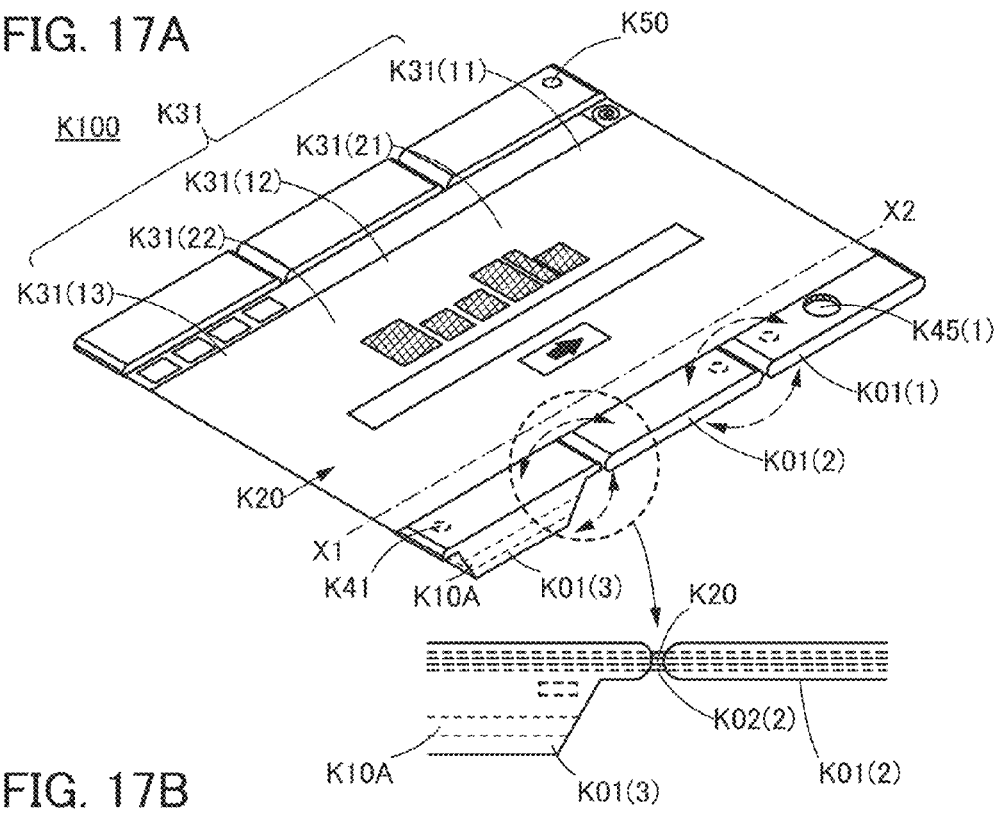
FIGS. 17A to 17C are each a projection view illustrating a structure of a data processing device of one embodiment.
Figure 17B:
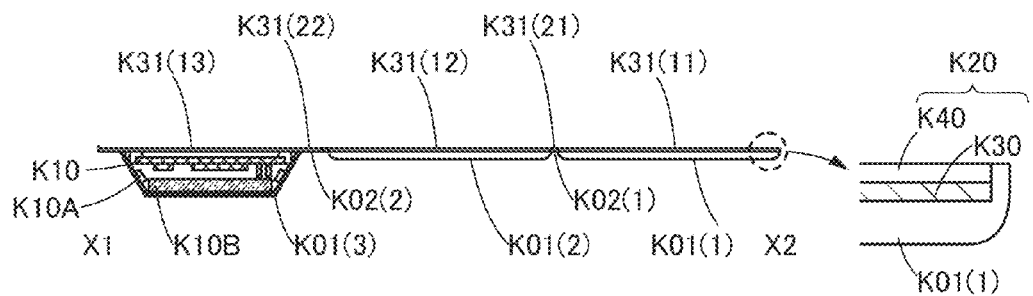
Figure 17C:
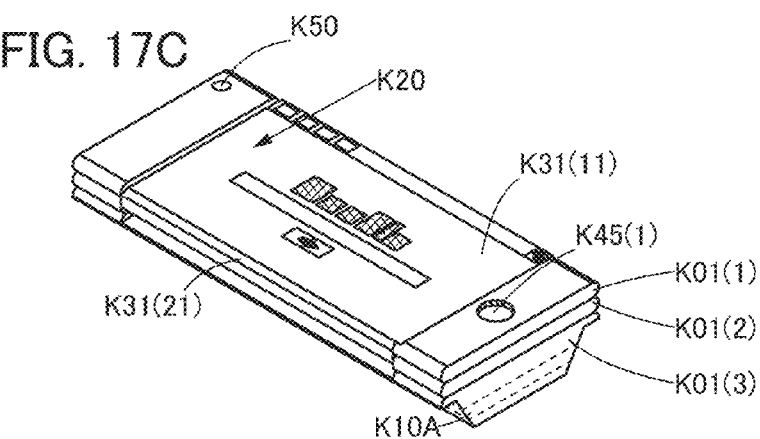

FIGS. 17A to 17C illustrate a data processing devices of one embodiment of the present invention.

FIG. 17A is a projection view illustrating an input/output device K20 of a data processing device K100 of one embodiment of the present invention which is unfolded.

FIG. 17B is a cross-sectional view of the data processing device K100 along line X1-X2 in FIG. 17A. FIG. 17C is a projection view illustrating the input/output device K20 which is folded.

<Structure Example of Data Processing Device>

The data processing device K100 described in this embodiment includes the input/output device K20, an arithmetic device K10, or housings K01(1) to K01(3) (see FIGS. 17A to 17C).

<<Input/Output Device>>

The input/output device K20 includes a display device K30 and an input device K40. The input/output device K20 is supplied with image data V and supplies sensing data S (see FIG. 17B).

The display device K30 is supplied with the image data V and the input device K40 supplies the sensing data S.

The input/output device K20, in which the input device K40 and the display device K30 integrally overlap with each other, serves not only as the display device K30 but also as the input device K40.

The input/output device K20 using a touch sensor as the input device K40 and a display panel as the display device K30 can be referred to as a touch panel.

<<Display Device>>

The display device K30 includes a region K31 where a first region K31(11), a first bendable region K31(21), a second region K31(12), a second bendable region K31(22), and a third region K31(13) are arranged in stripes in this order (see FIG. 17A).

The display device K30 can be folded and unfolded along a first fold line formed in the first bendable region K31(21) and a second fold line formed in the second bendable region K31(22) (see FIGS. 17A and 17C).

For example, the display panel described in Embodiment 1 or 4 can be used.

<<Arithmetic Device>>

The arithmetic device K10 includes an arithmetic portion and a memory portion that stores a program to be executed by the arithmetic unit. The arithmetic device supplies the image data V and is supplied with the sensing data S.

<<Housing>>

A housing includes a housing K01(1), a hinge K02(1), a housing K01(2), a hinge K02(2), and the housing K01(3) which are placed in this order.

In the housing K01(3), the arithmetic device K10 is stored. The housings K01(1) to K01(3) hold the input/output device K20, and enable the input/output device K20 to be folded and unfolded (see FIG. 17B).

In the example described in this embodiment, the data processing device has the three housings connected with one another with the two hinges. The input/output device K20 in this data processing device can be bent at the positions with the two hinges.

Note that n housings (n is a natural number of two or more) may be connected with one another with (n−1) hinges. The data processing device having this structure can be folded with the input/output device K20 bent at (n−1) positions.

The housing K01(1) overlaps with the first region K31(11) and includes a button K45(1).

The housing K01(2) overlaps with the second region K31(12).

The housing K01(3) overlaps with the third region K31(13) and stores the arithmetic device K10, an antenna K10A, and a battery K10B.

The hinge K02(1) overlaps with the first bendable region K31(21) and connects the housing K01(1) rotatably to the housing K01(2).

The hinge K02(2) overlaps with the second bendable region K31(22) and connects the housing K01(2) rotatably to the housing K01(3).

The antenna K1 OA is electrically connected to the arithmetic device K10 and supplies a signal or is supplied with a signal.

In addition, the antenna K10A is wirelessly supplied with power from an external device and supplies power to the battery K10B.

The battery K10B is electrically connected to the arithmetic device K10 and supplies power or is supplied with power.

<<Folding Sensor>>

A folding sensor K41 senses whether the housing is folded or unfolded and supplies data showing the state of the housing.

The arithmetic device K10 is supplied with data showing the state of the housing.

In the case where the data showing the state of the housing K01 is data showing a folded state, the arithmetic device K10 supplies the image data V including a first image to the first region K31(11) (see FIG. 17C).

When the data showing the state of the housing K01 is data showing an unfolded state, the arithmetic device K10 supplies the image data V to the region K31 of the display device K30 (see FIG. 17A).

<<Sensing Portion>>

A sensing portion K50 can sense illuminance under usage environment of the display device K30, and supply sensing data including data of the illuminance.

For example, a sensor circuit that supplies data of environmental illuminance on the basis of a photoelectric conversion element and a signal supplied from the photoelectric conversion element can be used for the sensing portion K50.

This embodiment can be combined with any of the other embodiments in this specification as appropriate.

Embodiment 8

In this embodiment, a structure of a data processing device of one embodiment of the present invention will be described with reference to FIGS. 7A, 7B, 7C1, and 7C2, and FIGS. 18A1, 18A2, 18A3, 18B1, 18B2, 18C1, and 18C2.

Figure 7A:
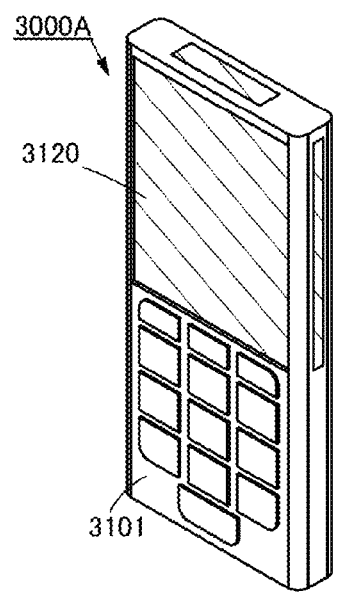
Figure 7B:
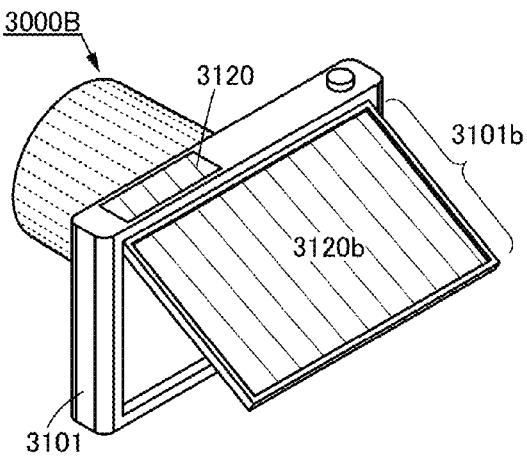
Figure 7B:
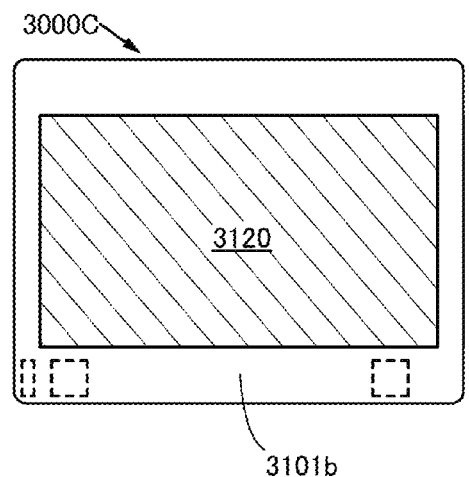
Figure 7B:
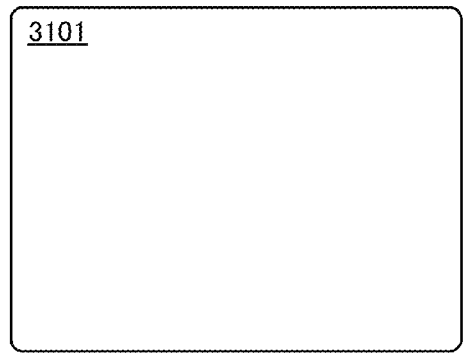

FIGS. 7A to 7C each illustrate a data processing device of one embodiment of the present invention. FIG. 7A is a projection view of a data processing device of one embodiment of the present invention. FIG. 7B is another projection view of a data processing device of one embodiment of the present invention. FIGS. 7C1 and 7C2 are a top view and a bottom view of another data processing device of one embodiment of the present invention.

FIGS. 18A to 18C each illustrate a data processing device of one embodiment of the present invention. FIGS. 18A1 to 18A3 are projection views of a data processing device of one embodiment of the present invention. FIGS. 18B1 and 18B2 are projection views of a data processing device of one embodiment of the present invention. FIGS. 18C1 and 18C2 are a top view and a bottom view of a data processing device of one embodiment of the present invention.

<<Data Processing Device A>>

A data processing device 3000A includes an input/output portion 3120 and a housing 3101 supporting the input/output portion 3120 (see FIG. 7A).

The data processing device 3000A further includes an arithmetic portion, a memory portion storing a program that is executed by the arithmetic portion, and a power source such as a battery supplying power for driving the arithmetic portion.

Note that the housing 3101 stores the arithmetic portion, the memory portion, the batters or the like.

The data processing device 3000A can display image data on its side surface and/or top surface.

A user of the data processing device 3000A can supply operation instructions by using a finger in contact with the side surface and/or the top surface.

<<Data Processing Device B>>

A data processing device 3000B includes the housing 3101 and a housing 3101b connected to the housing 3101 with a hinge (see FIG. 7B).

The housing 3101 supports the input/output portion 3120.

The housing 3101b supports an input/output portion 3120b.

The data processing device 3000B further includes an arithmetic portion, a memory portion storing a program that is executed in the arithmetic portion, and a power source such as a battery supplying power for driving the arithmetic portion.

Note that the housing 3101 stores the arithmetic portion, the memory portion, the batters or the like.

The data processing device 3000B enables the input/output portion 3120 or the input/output portion 3120b to display image data.

A user of the data processing device 3000B can supply operation instructions with the finger touching the input/output portion 3120 or the input/output portion 3120b.

<<Data Processing Device C>>

A data processing device 3000C includes the input/output portion 3120 and the housing 3101b supporting the input/output portion 3120 (see FIGS. 7C1 and 7C2).

The data processing device 3000C further includes an arithmetic portion, a memory portion storing a program that is executed by the arithmetic portion, and a power source such as a battery supplying power for driving the arithmetic portion.

Note that the housing 3101 stores the arithmetic portion, the memory portion, the batters or the like.

<<Data Processing Device D>>

A data processing device 3000D includes the input/output portion 3120 and the housing 3101 supporting the input/output portion 3120 (see FIGS. 18A1 to 18A3).

The data processing device 3000D further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, or the like.

The data processing device 3000D can display image data on its side surface and/or top surface.

A user of the data processing device 3000D can supply operation instructions by using a finger in contact with the side surface and/or the top surface.

<<Data Processing Device E>>

A data processing device 3000E includes the input/output portion 3120 and the input/output portion 3120b (see FIGS. 18B1 and 18B2).

The data processing device 3000E further includes the housing 3101 and a belt-shaped flexible housing 3101b that support the input/output portion 3120.

The data processing device 3000E includes the housing 3101 supporting the input/output portion 3120b.

The data processing device 3000E further includes an arithmetic portion, a memory portion storing a program that is executed by the arithmetic portion, and a power source such as a battery supplying power for driving the arithmetic portion.

Note that the housing 3101 stores the arithmetic portion, the memory portion, the batters or the like.

The data processing device 3000E can display image data on the input/output portion 3120 supported by the belt-shaped flexible housing 3101b.

A user of the data processing device 3000E can supply operation instructions by using a finger in contact with the input/output portion 3120.

<<Data Processing Device F>>

A data processing device 3000F includes the input/output portion 3120 and the housings 3101 and 3101b supporting the input/output portion 3120 (see FIGS. 18C1 and 18C2).

The input/output portion 3120 and the housing 3101b have flexibility.

The data processing device 3000F further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, or the like.

The data processing device 3000F can be folded in two at a portion of the housing 3101b.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, another element may be provided between elements having a connection relation illustrated in drawings and texts, without limitation on a predetermined connection relation, such as the connection relation illustrated in the drawings and the texts.

Here, X and Y each denote an object (e.g., a device, an element, a circuit, a wiring, an electrode, a terminal, a conductive film, a layer, or the like).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit, or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. When a signal output from X is transmitted to Y, it can be said that X and Y are functionally connected even if another circuit is provided between X and Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Another example of the expression is "a source (or a first terminal or the like) of a transistor is electrically connected to X through at least Z1 on a first connection path, the first connection path does not include a second connection path, the second connection path includes a connection path where the transistor is provided, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2014-162242 filed with Japan Patent Office on Aug. 8, 2014 and Japanese Patent Application serial no. 2014-162278 filed with Japan Patent Office on Aug. 8, 2014, the entire contents of which are hereby incorporated by reference.

What is claimed is:
1. A display panel comprising:
a first base;
a second base overlapping with the first base;
a first display element capable of emitting light;
a second display element capable of controlling transmittance of the light; and
an insulating layer,
wherein the first display element comprises a first electrode, a common electrode, and an EL layer,
wherein the EL layer comprises a luminescent organic compound,
wherein the common electrode overlaps with the first electrode,
wherein the EL layer is positioned between the first electrode and the common electrode,
wherein the second display element comprises a second electrode and a liquid crystal layer;
wherein the liquid crystal layer comprises liquid crystal, wherein the second electrode overlaps with the common electrode, wherein the liquid crystal layer is positioned between the common electrode and the second electrode, wherein the insulating layer is positioned between the common electrode and the liquid crystal layer, and wherein the second display element overlaps with the first display element.

2. The display panel according to claim 1, wherein the first base and the second base have flexibility.

3. The display panel according to claim 1,
wherein the liquid crystal layer comprises a polymer, and
wherein the liquid crystal is dispersed in the polymer.

4. The display panel according to claim 1,
wherein the first display element is capable of displaying an image toward the second display element by controlling emission of light to a side where the second display element is provided, and
wherein the second display element is capable of displaying an image by controlling transmittance of light entering from the opposite side to a side where the first display element is provided.

5. The display panel according to claim 1, further comprising a coloring layer,
wherein the second electrode is positioned between the coloring layer and the liquid crystal layer.

6. A data processing device comprising:
an input/output device comprising a display device and a sensing portion; and
an arithmetic device comprising an arithmetic portion and a memory portion,
wherein the display device comprises the display panel according to claim 1,
wherein the sensing portion is capable of sensing illuminance under usage environment of the display device and supplying sensing data including data of the illuminance,
wherein the arithmetic device is capable of receiving the sensing data and supplying image data,
wherein the memory portion is capable of storing a program to be executed in the arithmetic portion, and
wherein the program comprises a step of making the first display element display the image data and making light transmittance of the second display element high when the sensing data includes data of the illuminance less than a predetermined illuminance, and a step of making the second display element display the image data when the sensing data includes data of the illuminance more than or equal to the predetermined illuminance.

7. The program to be executed in the arithmetic portion of the data processing device according to claim 6,
wherein initialization is performed in a first step,
wherein interrupt processing is allowed in a second step,
wherein image data is generated in a third step,
wherein the sensing data is obtained in a fourth step,
wherein, in a fifth step, processing is determined to proceed to a sixth step if the sensing data comprises the data of the illuminance less than the predetermined illuminance while determined to proceed to a tenth step if the sensing data includes the data of the illuminance more than or equal to the predetermined illuminance,
wherein transmittance of the second display element is made high in the sixth step,
wherein the image data is displayed on the first display element in a seventh step,
wherein, in an eighth step, the processing is determined to proceed to a ninth step if a termination instruction has been supplied while determined to return to the third step if the termination instruction has not been supplied,
wherein the processing is terminated in the ninth step, and
wherein, in the tenth step, the second display element displays the image data and the processing returns to the eighth step.

8. A data processing device comprising:
the display panel according to claim 1; and
at least one of an antenna, a battery, a button, and a housing.

* * * * *